United States Patent
Fukuhara et al.

(10) Patent No.: US 6,501,863 B1
(45) Date of Patent: Dec. 31, 2002

(54) IMAGE CODING APPARATUS, IMAGE CODING METHOD, IMAGE DECODING APPARATUS, IMAGE DECODING METHOD AND TRANSMISSION MEDIUM

(75) Inventors: Takahiro Fukuhara, Kanagawa (JP); Seiji Kimura, Chiba (JP); Kenzo Akagiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/162,120

(22) Filed: Sep. 28, 1998

(30) Foreign Application Priority Data

Sep. 29, 1997 (JP) .............................. 9-264501

(51) Int. Cl.$^7$ ................................. G06K 9/36
(52) U.S. Cl. .................... 382/251; 382/232; 382/233; 382/234; 382/240; 382/245
(58) Field of Search ................ 382/240, 244, 382/251, 245, 234, 250, 232, 233, 239, 248

(56) References Cited

U.S. PATENT DOCUMENTS

| | | | | | |
|---|---|---|---|---|---|
| 5,223,926 | A | * | 6/1993 | Stone et al. ................. | 358/133 |
| 5,227,878 | A | * | 7/1993 | Puri et al. .................... | 358/136 |
| 5,859,826 | A | * | 1/1999 | Ueno et al. ................... | 369/59 |
| 6,091,777 | A | * | 7/2000 | Guetz et al. ................. | 375/240 |
| 6,097,880 | A | * | 8/2000 | Koyata ........................ | 386/112 |
| 6,134,269 | A | * | 10/2000 | Puri et al. .................... | 375/240 |
| 6,167,093 | A | * | 12/2000 | Tsutsui et al. ............... | 375/242 |

FOREIGN PATENT DOCUMENTS

| | | |
|---|---|---|
| JP | 4-44099 | 2/1992 |
| JP | 6-66067 | 3/1994 |
| JP | 6-66068 | 3/1994 |
| JP | 7-50835 | 2/1995 |

OTHER PUBLICATIONS

J. P. Princen et al., "Subband/Transform Coding Using Filter Bank Designs Based on Time Domain Aliasing Cancellation," ICASSP, vol. 4, Apr. 1987, pp. 2161–2164.

J. Rothweiler, "Polyphase Quadrature Filters—A New Subband Coding Technique," ICASSP 83 Proceedings, Boston, vol. 3, Apr., 1983, pp. 1280–1283.

U.S. patent application Ser. No. 09/336,504, filed Jun. 18, 1999.

* cited by examiner

*Primary Examiner*—Phuoc Tran
*Assistant Examiner*—Ali Bayat
(74) *Attorney, Agent, or Firm*—Sonneschein, Nath & Rosenthal

(57) ABSTRACT

The present invention relates to an image coding apparatus/method, an image decoding apparatus/method, and a transmission medium, which conduct high-efficiency coding or decoding of an image, and applicable in a system performing efficient transmission or accumulation of images. In coding an image after splitting the image into a plurality of bands, the invention is characterized in a process comprising the steps of splitting the image into a plurality of bands, applying quadrature transformation to the images of the resultant band components, quantizing the resultant quadrature transformation coefficients, and generating a coded bit stream by variable-length-coding the quantization coefficient. This permits coding less susceptible to block strain at a high compression ratio.

12 Claims, 18 Drawing Sheets

A : A BLOCK TO BE CODED
B, C, D : NEIGHBORING BLOCKS NECESSARY UPON DECODING

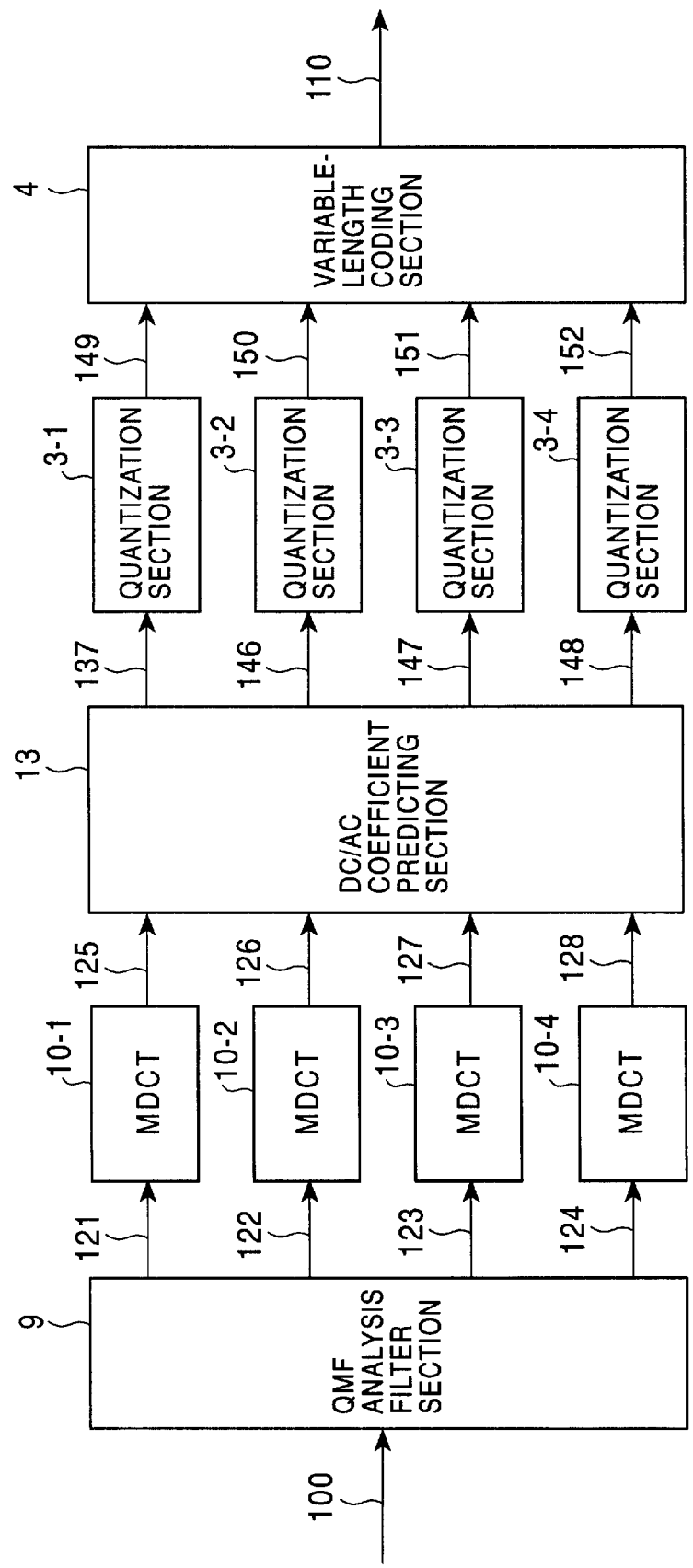

IMAGE CODING APPARATUS, IMAGE CODING METHOD, IMAGE DECODING APPARATUS, IMAGE DECODING METHOD AND TRANSMISSION MEDIUM

BACKGROUND OF THE INVENTION

1. Field of the Invention

The present invention relates to an image coding apparatus, an image coding method, an image decoding apparatus, an image decoding method and a transmission medium, applicable for a system which codes or decodes an image at a high efficiency and transmits or efficiently stores the image. More particularly, the invention relates to an image coding apparatus, an image coding method, an image decoding apparatus, an image decoding method and a transmission medium which are applicable to a compressing and extending apparatus of a high-precision fine image such as a satellite image or a medical image or a software module thereof, or a compressing and extending apparatus of texture used in games or three-dimensional CG or a software module thereof.

2. Description of the Related Art

One of the typical conventional image compressing methods is the JPEG (Joint Photographic Experts Group) method standardized by the ISO (International Organization for Standardization). This is an image compressing method using DCT (Discrete Cosine transform), in which a satisfactory coded or decoded image is available when it is possible to assign relatively numerous coding bits to each pixel.

If the number of coding bits is reduced to below a certain level, however, there occurs serious block distortion unique to DCT, leading to apparent deterioration of image subjectively. Various organizations have therefore proposed techniques for solving this block distortion unique to DCT, including, for example, a technique using DC/AC conversion known as MDCT (Modified DCT) is disclosed by J. Princen, et al. in "Subband/Transform Coding Using Filter Bank Designs Based on Time Domain Aliasing Cancellation" released in the IEEE Proceedings ICASSP 87, 50.1, pp. 216102164, 1987. According to this MDCT, block distortion becoming apparent in DVT is known to be reduce by performing transformation while overlapping a block with the surrounding blocks. In general, MDCT can transform 2M time-serial sample data into M spectra, and perfectly restore the original: time-serial sample data by means of IMDCT (inverse MDCT).

As conventional arts concerning MDCT, these are available a "signal transforming apparatus" disclosed in Japanese Patent Publications Nos. 6-66067 and 06-66068, and "a normal transform calculating apparatus and an inverse transform calculating apparatus for improved DCT" disclosed in Japanese Unexamined Patent Publication No. 4-44099. These inventions relate to a method for reducing the hardware volume of MDCT and a high-speed calculation of MDCT.

In an "image coding apparatus" disclosed in Japanese Unexamined Patent Publication No. 7-50835, on the other hand, it is taught that a dynamic image can be coded by splitting the image into subbands, and applying quadrature transformation to the thus split low-level components.

Unlike the reduction of the hardware volume of MDCT or achievement of a higher speed of calculation, the objects of the Japanese patent Publications Nos. 6-766067 and 6-66068 and Japanese Unexamined Patent Publication No. 4-44099, the present invention has an object to accomplish high-efficiency image coding and decoding by the concrete application of MDCT as a technique for quadrature transformation. Therefore, Japanese Unexamined Patent Publication No. 7-50835 in which quadrature transformation is actually applied and subband splitting is carried out in the first stage of the process will be described as an example of the conventional arts.

FIG. 18 is a block diagram illustrating a configuration of a first embodiment of the aforementioned Japanese Unexamined Patent Publication No. 7-50835.

In FIG. 18, a subband splitter 200 can subband-split an original image into a low-level image and a plurality of high-level images. A quadrature transformer 201 applies quadrature transformation by splitting a low-level image 301 provided as an output from the subband splitter 200 into blocks of a first size, and outputs the same as blocks 302. A block splitter 202 splits a plurality of high-level images generated by the subband splitter 200 and supplied via the quadrature transformer 201 into blocks of a first size, and can perform hybrid transformation by synthesizing the blocks 302 of a first size quadrature-transformed by the quadrature transformer 201 and blocks of a first size of high-level images to generate a block of a second size.

The subband splitter 200, the quadrature transformer 201 and the block splitter 202 constitute a hybrid transformer 213.

A mode selector 203 compares a hybrid transformation coefficient 303 output from the block splitter 202 and a differential transformation coefficient 304 output from an adder 204, and changes over between a switch 215 and a switch 216.

The adder 204 calculates a difference between, the hybrid transformation coefficient 303 of an original image output from the block splitter 202 and a hybrid transformation coefficient 305 of a reference image output from a motion compensation predictor 205.

The motion compensation predictor 205 predicts a motion compensation of the hybrid transformation coefficient 303. A motion vector detector 206 detects a motion vector by comparing an output of a subband synthesizer 212 and an original image 300.

A quantizer 207 quantizes a signal from the switch 215 and outputs the same. An inverse quantizer 208 inverse-quantizes a signal 310 quantized by the quantizer 207.

An adder 209 adds and outputs an output signal 311 from the inverse quantizer 208 and a signal 307 from the switch 216.

A frame memory 210 rearranges the hybrid transformation coefficients 303 to generate a low-level image and a plurality of high-level images. An inverse quadrature transformer 211 splits the low-level image into blocks of a first size to conduct inverse quadrature transformation. The subband synthesizer 212 form the entire image through synthesis of subbands.

The frame memory 210, the inverse quadrature transformer 211 and the subband synthesizer 212 constitute a hybrid inverse transformer 214.

Operations of the aforementioned conventional art will now be described.

The subband splitter 200 subband-splits an original image into a low-level image 301 and a plurality of high-level images, and the quadrature transformer 201 splits the low-level image 301 into blocks of a first size to subject them to quadrature transformation. The block splitter 202 splits the plurality of high-level images further into blocks of the first size. It further synthesizes the quadrature-transformed blocks 302 of the first size and the blocks of the first size of the high-level images to form blocks of a second size, thereby performing a hybrid transformation. These are the operations in the hybrid transformer 213.

The frame memory 210 prepares a low-level image and a plurality of high-level images b rearranging the hybrid transformation coefficients 312. The inverse quadrature transformer 211 splits the low-level image into blocks of the first size and subjects the split blocks to an inverse quadrature transformation. The subband synthesizer 212 subband-synthesizes the entire image. These are the operations of the hybrid inverse transformer 214. As a result of these operations for hybrid inverse transformation, a decoded image 318 is generated. The resultant decoded image 318 is entered into the motion compensation predictor 205, where motion compensation prediction of the hybrid transformation coefficient 303 is conducted.

The adder 204 calculates a difference between the hybrid transformation coefficient 303 of the original image output from the block splitter 202 and the hybrid transformation coefficient 305 of the reference image output from the motion compensation predictor 205.

The mode selector 203 compares the hybrid transformation coefficient 303 output from the block splitter 202 and the differential transformation coefficient 304 output from the adder 204, selects any of them for coding for each block, and changes over the mode between the switch 215 and switch 216.

The quantizer 207 quantizes a signal from the switch 215, and the inverse quantizer 208 inverse-quantizes a quantized signal. The adder 209 adds an output signal 311 from the inverse quantizer 208 and a signal 307 from the switch 216, and outputs a restored hybrid transformation coefficient 312. The frame memory 210 restores stored hybrid transformation coefficients 312 while rearranging them in the form of low-level image (LL) and high-level images (LH, HL and HH). The inverse quadrature transformer 211 inverse-quadrature-transforms the low-level images (LL) of signals stored in the frame memory 210. The subband synthesizer 212 generates the reference image 318 by synthesizing an output 314 of the inverse quadrature transformer 211.

The aforementioned conventional case is typical conventional method comprising the steps of conducting subband-slitting first, and then quadrature transformation in the latter half. In this example, quadrature transformation is applied only to the low-level image (LL) of the original image obtained as result of subband splitting, and the image is reconstructed through rearrangement without applying quadrature transformation to the high-level images.

The above-mentioned method has a problem of image quality deterioration in the case of an image having may high-level component in the vertical or the horizontal direction.

SUMMARY OF THE INVENTION

The present invention was developed in view of the circumstances as described above, and has an object to provide high-efficiency image coding apparatus and image decoding apparatus which makes it possible to obtain a high-quality coded or decoded image less susceptible to block strain even at a high compression ratio.

The image coding apparatus and method of the present invention of splitting an image into a plurality of bands, then coding are based on a process comprising the steps of splitting an image into a plurality of bands by splitting means, applying quadrature transformation to images of the band components obtained by the splitting means, quantizing quadrature transformation coefficient obtained by the quadrature transforming means by the use of quantizing means, and variable-length-coding quantization coefficients of the individual band components obtained by the quantizing means, thereby generating a coded bit stream.

The image decoding apparatus and method of the present invention of splitting an image into a plurality of bands an based on a process comprising the steps of variable-length-decoding a coded bit stream of an image by a variable length decoding means, inverse-quantizing quantization coefficients of the plurality of band components obtained by the variable length decoding means, quadrature-inverse-transforming, by a quadrature inverse transforming means, quadrature transformation coefficients of the band components obtained by the inverse quantizing means, and synthesizing an image of the individual band components obtained by the quadrature inverse transforming means.

BRIEF DESCRIPTION OF THE DRAWINGS

FIG. 10 is a block diagram illustrating a configuration of the fourth embodiment of the image coding apparatus of the invention;

DESCRIPTION OF THE PREFERRED EMBODIMENT

Figure 1:
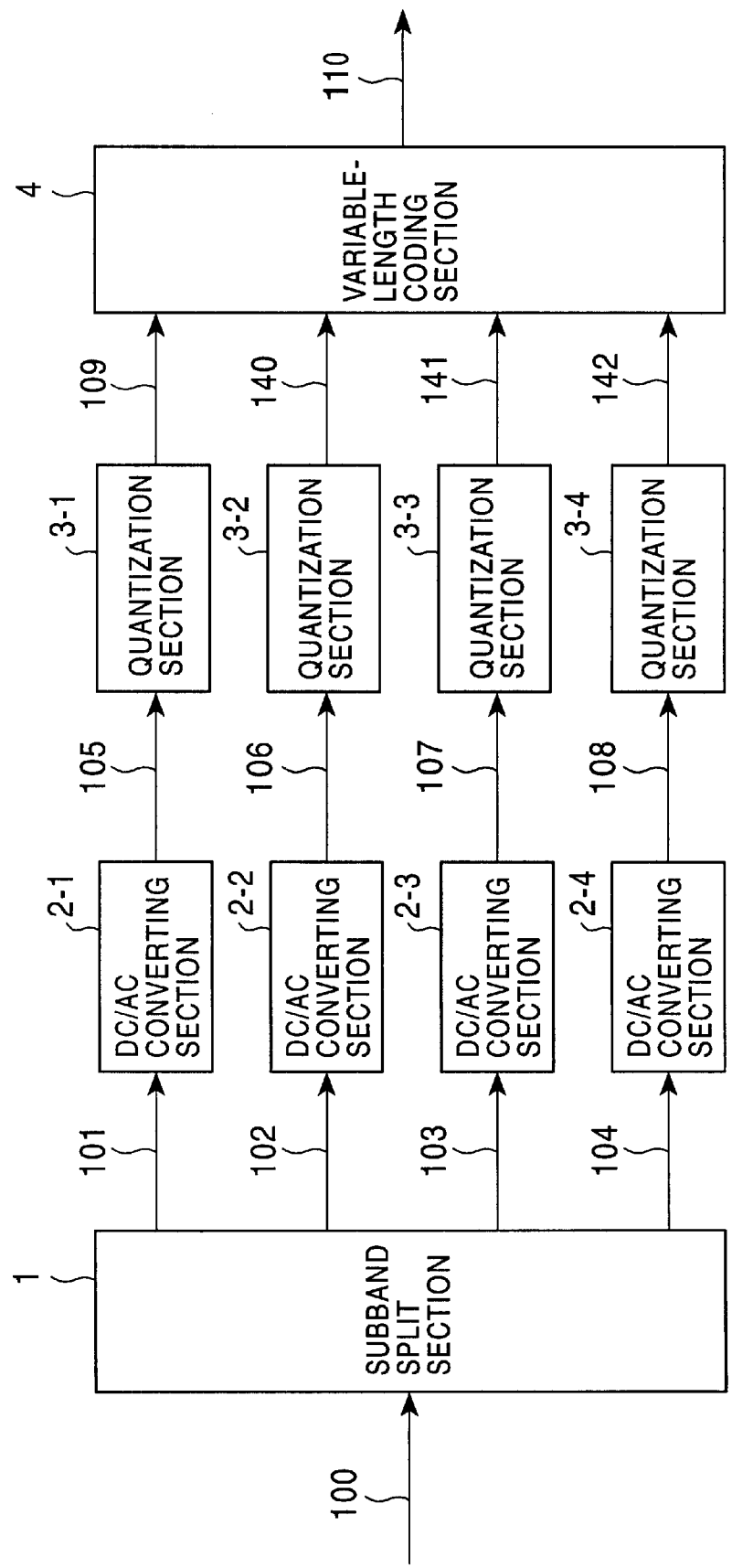
FIG. 1 is a block diagram illustrating a configuration of a first embodiment of the image coding apparatus of the present invention.
Figure 18:
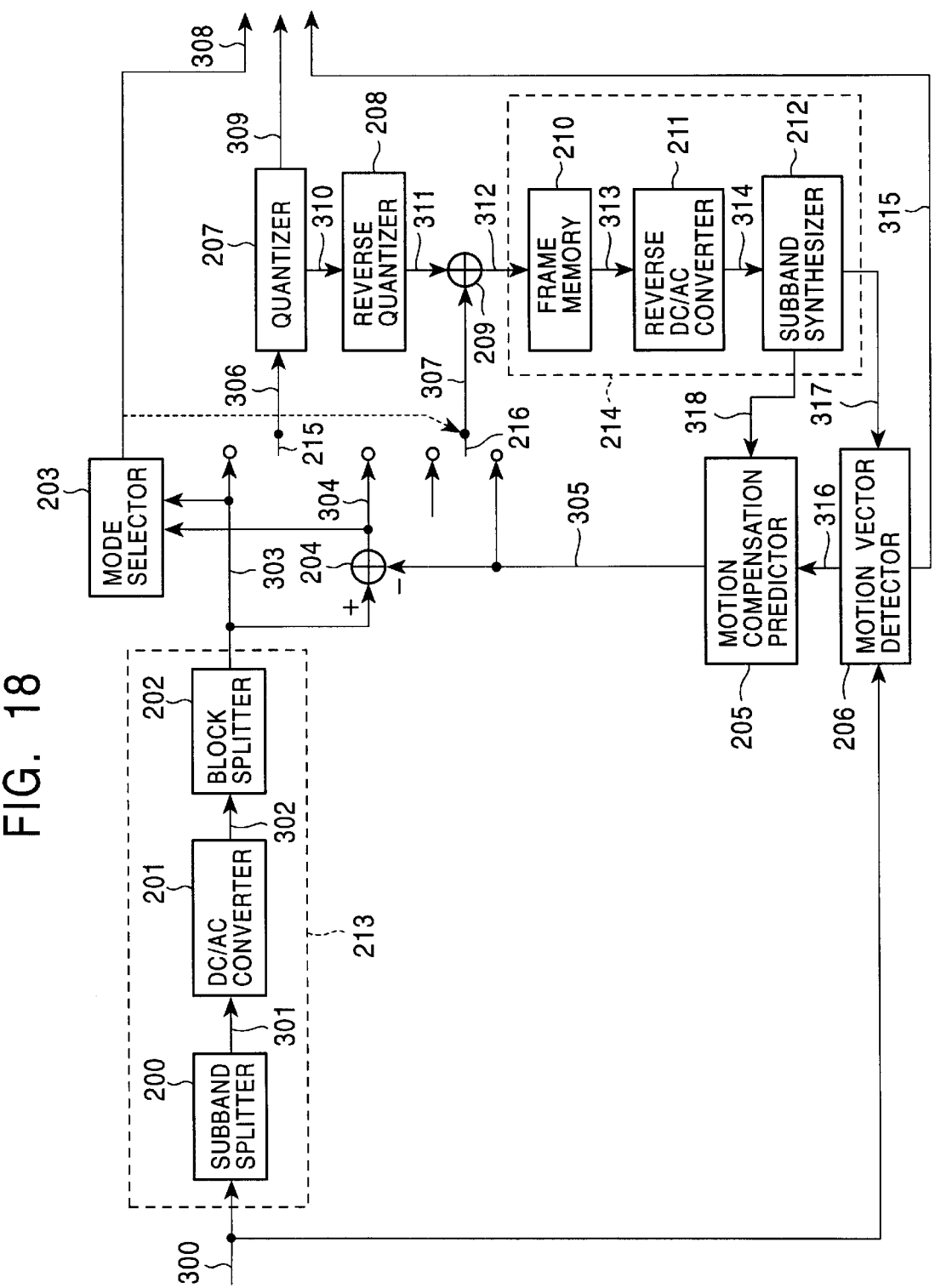
FIG. 18 is a block diagram illustrating a configuration of a conventional image coding apparatus.

FIG. 1 is a block diagram illustrating a configuration of a first embodiment of the image coding apparatus of the present invention. This embodiment represents a detailed configuration of a hybrid transformer 2/3 shown in FIG. 18.

In FIG. 1, a subband splitting section 1 (splitting means) has a function of splitting a digitized input image 100 into frequency bands in a prescribed number. In this embodiment, the input image 100 is split into four frequency bands (LL, HL, LH and HH) which are output as band component images 101 to 104 respectively.

Quadrature transforming sections 2-1 to 2-4 (quadrature transforming means) apply quadrature transformation to images 101 to 104 of the individual band component output from the subband splitting section 1 (hereinafter referred to as required as "band component images"), and output quadrature transformation coefficients 105 to 108, respectively.

Quantizing section 3-1 to 3-4 (quantizing means, scanning means) quantizes quadrature transformation coefficients 105 to 108 output, respectively, from quadrature transforming sections 2-1 to 2-4 with a prescribed number of quantizing bits, and outputs as quantization coefficients 109, 140, 141 and 142, respectively.

A variable-length coding section 4 (generating means) variable-length-codes the quantization coefficients output from the quantizing sections 3-1 to 3-4 and outputs a coded bit stream 110.

In the aforementioned embodiment, a configuration in which the image is split into four bands has been presented for the convenience of description. It is however needless to mention that the number of images of the individual components should be changed in response to the number of bands.

Operations of the embodiment described above will now be described.

The digitized input image 100 is split into four frequency bands in the subband splitting section 1.

Figure 2:
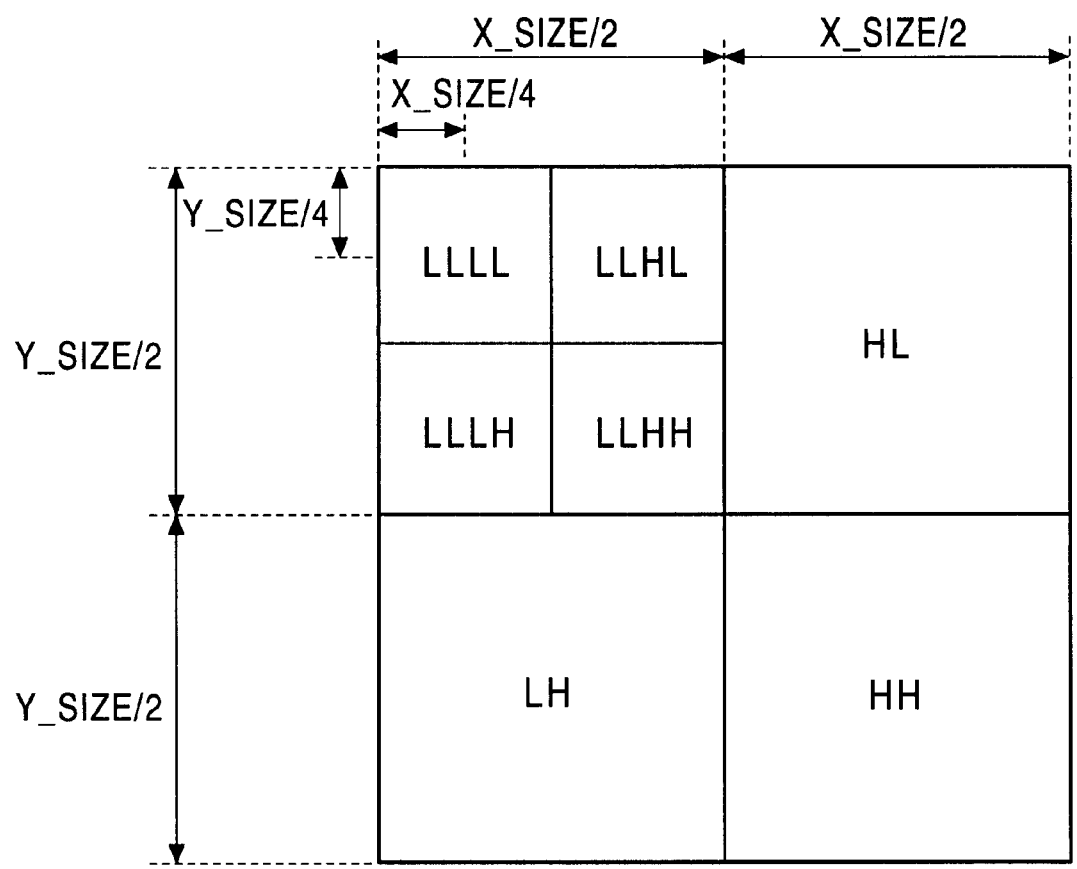
FIG. 2 illustrates subband splitting of an image.

FIG. 2 illustrates subband splitting of an image in this embodiment. As shown in FIG. 2, in this embodiment, the entire image is first split into four bands (LL, HL, LH and HH), and then, a low-level image (LL component) is further split into four bands (LLLL, LLHL, LLLH and LLLHD).

More specifically, in this embodiment, there are first generated a low-level (LL) 101 component image, a high-level (HL) component image 102, a high-level (LH) component image 103, and a high-level (HH) component image 104 as a result of subband splitting. Then, quadrature transformation is applied to the aforementioned individual band component images at quadrature transforming sections 2-1 to 2-4 to generate quadrature transformation coefficient 105 to 108 for the individual band components. The quadrature transformation coefficients 105 to 108 of the individual components are quantified at quantifying sections 3-1 to 3-4, thus generating quantization coefficients 109, 140, 141 and 142 for the individual band components. The quantization coefficient for each band component is variable-length-coded at a variable length coding section 4, and a coded bit stream 110 is provided as a coded bit stream 110 as an output.

For the purpose of reducing the volume of codes, the resultant quantization coefficients are scanned at the quantizing sections 3-1 to 3-4, and the quantization coefficients are rearranged. This is based on the utilization of the fact that larger values occur for the low-level components of the quadrature transformation coefficients, where as many 0s occur, in contrast, for the high-level components.

According to the aforementioned embodiment, the process comprises the step of carrying out subband splitting in the first stage of the process, conducting quadrature transformation in the latter half, applying quadrature transformation not only to the low-level image components, but also to the high-level images, and quantizing and variable-length-coding the resultant transformation coefficients of the individual band components. As a result, it is possible to obtain a high quality image less susceptible to occurrence of block strain even when coding or decoding an image containing many vertical or horizontal high-level components.

In the present embodiment, the quadrature transforming sections 2-1 to 2-4 and the quantizing sections 3-1 to 3-4 in a number equal to that of the subband-split bands are arranged it is also possible to adopt a configuration in which only one quadrature transforming section and one quantizing section are provided, and the subband split band images are sequentially entered into the quadrature transforming section by means of a switch or the like, or a configuration permitting high-speed processing by conducting parallel processing of the quadrature transforming sections and the quantizing sections in a number corresponding to that of the bands after mounting. It suffices, for example, to determine conditions in compliance with required conditions including the hardware scale and the processing speed.

Figure 3:
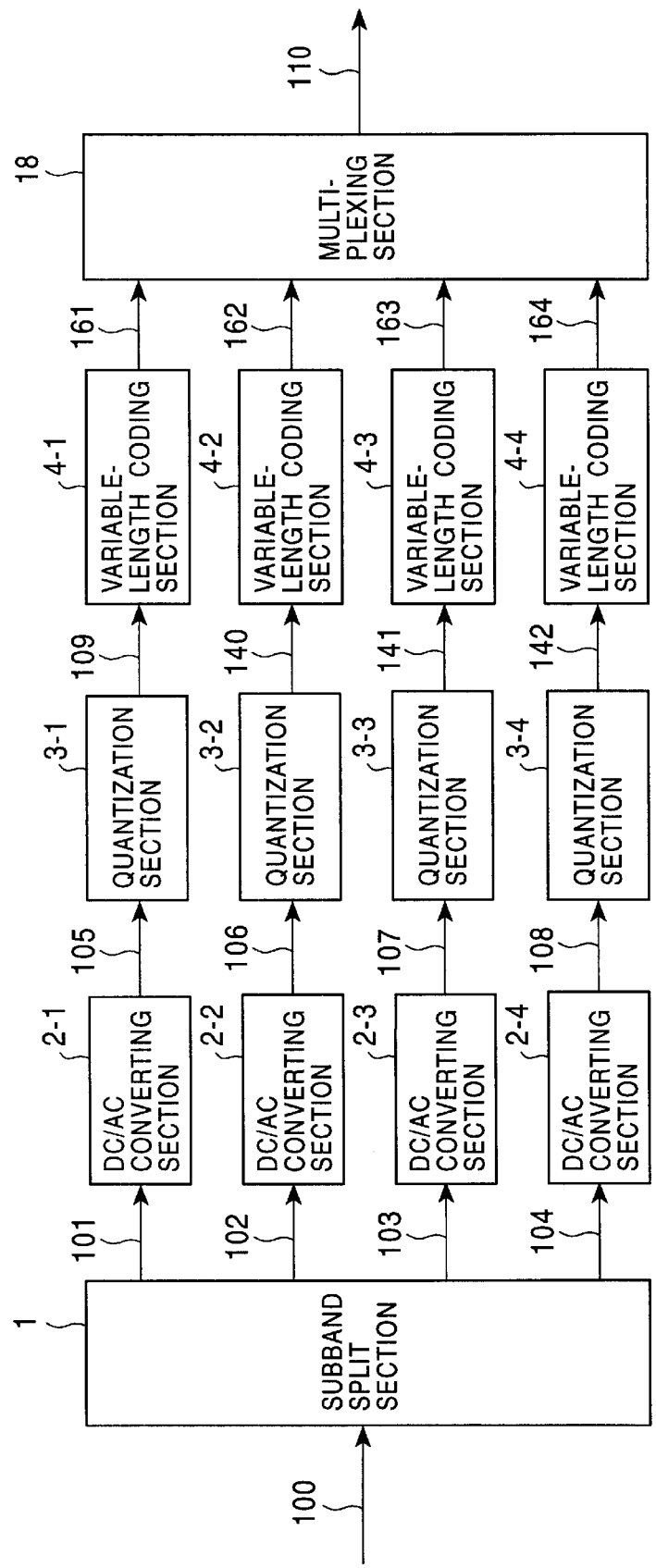
FIG. 3 is a block diagram illustrating a configuration of a second embodiment of the image coding apparatus of the invention.

In the above-mentioned embodiment, only one variable-length coding section 4 is provided to generate a coded bit stream 110. It is also possible, for example as shown in FIG. 3, to provide variable-length coding sections 4-1 to 4-4 and a multiplexing section 18 for each band component, and provide a variable-length table prepared by taking account of features of each band component for each of the variable-length coding sections 4-1 to 4-4. Such a configuration can further reduce the volume of occurrence of coded bits.

In a low-level (LL) component image, for example, the pixel value is generally large than high-level component images (HL, LH and HH): the quadrature transformation coefficient is therefore non-zero in many cases even after quantization. In the case of a high-level component, the quantization coefficient is after zero. The number of coded bits as a whole can therefore be reduced by assigning variable-length code words giving a short code length to non-zero coefficients for a low-level (LL) component image, and on the other hand, assigning variable-length code words giving a short code length to zero-coefficients for a high-level component image.

Figure 4:
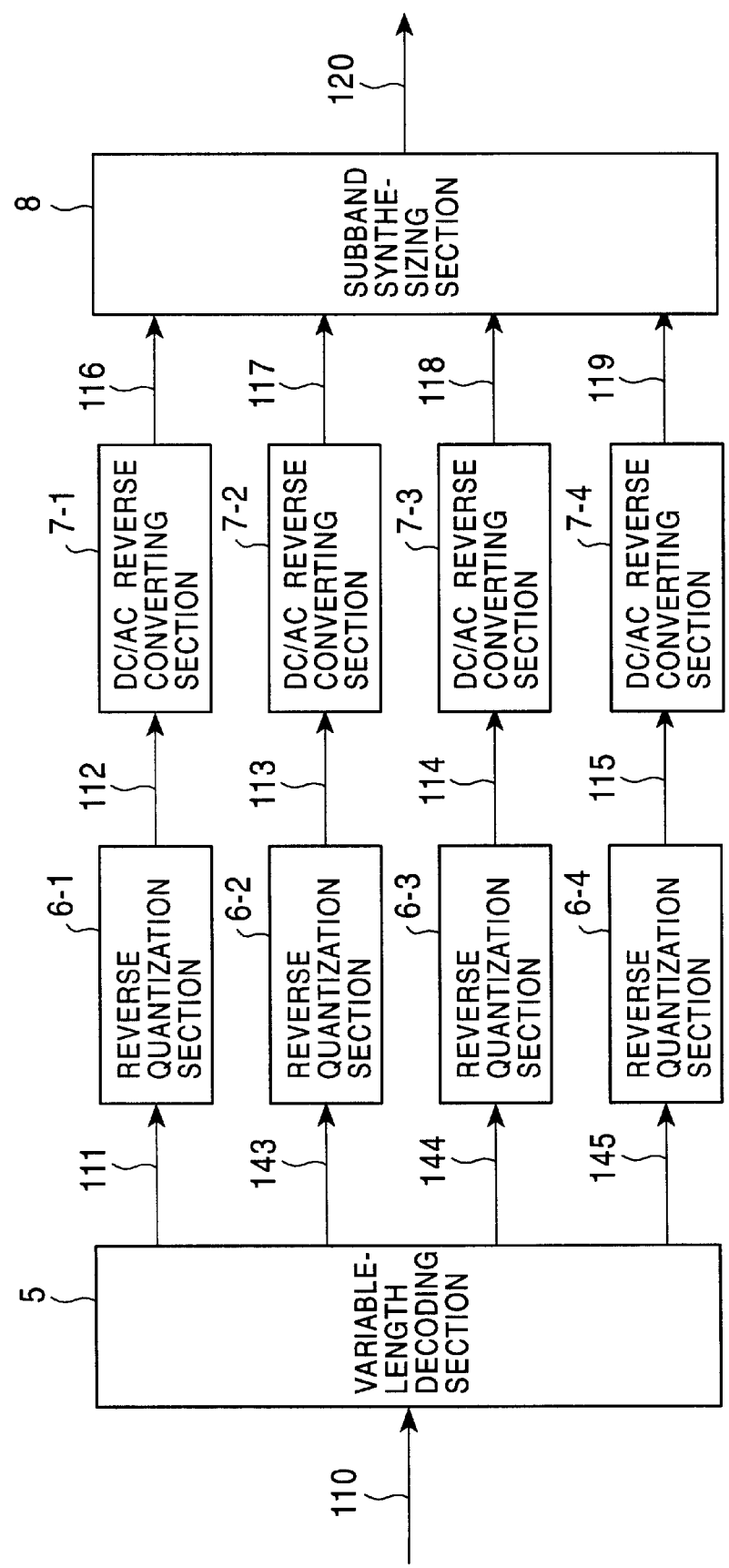
FIG. 4 is block diagram illustrating a configuration of a first embodiment of the image decoding apparatus of the invention.

FIG. 4 is a block diagram illustrating a configuration of a first embodiment of the image decoding apparatus of the invention. This embodiment is applicable to the hybrid inverse transform 214 shown in FIG. 18, and is associated with the image coding apparatus shown in FIG. 1.

In FIG. 4, a variable-length decoding sections (variable-length decoding means) receives an input coded bit stream 110 and outputs quantization coefficients 111, 143, 144 and 145 for the individual band components.

Inverse quantizer sections 6-1 to 6-4 (inverse quantizing means, inverse scanning means) inversely quantizes the quantization coefficients output from the variable-length coding section 5, and outputs resultant quadrature transformation coefficients 112 to 115 for the individual band components.

Quadrature inverse transforming sections 7-1 to 7-4 (quadrature inverse transforming means) applies quadrature inverse transformation to the quadrature coefficients 112 to 115 output from the inverse quantizing sections 6-1 to 6-4, and outputs images 116 to 119 for the individual band components.

A subband synthesizing section 8 (synthesizing means) synthesizes the individual band component images 116 to 119 generated in the quadrature inverse transforming sections 7-1 to 7-4, and outputs a final decoded image 120.

Operations of the aforementioned embodiment will now be described.

The coded bit stream 110 is entered into the variable-length decoding section 5, where decoding is carried out, and the quantization coefficients 111, 143, 144 and 145 for the individual band components are output. These quantization coefficients are inversely quantized at the inverse quantizing sections 6-1 to 6-4, and the: quadrature transformation coefficients 112 to 115 for the individual band components are output.

The quadrature transformation coefficients are inversely quadrature-transformed at the quadrature inverse transforming sections 7-1 to 7-4, and images 116 to 119 for the individual band components are restored. The restored images 116 to 119 for the individual components are band-synthesized at the subband synthesizing section 8, and final decoded image 120 is output.

At the inverse quantizing sections 6-1 to 6-4, inverse scanning reverse to that carried out at the quantizing sections 3-1 to 3-4 is applied: the quantization coefficients are rearranged, and after bringing the coefficients to the original positions; quadrature transformation is inversely applied at the quadrature inverse transforming sections of 7-1 to 7-4.

In the aforementioned embodiment, the quadrature inverse transforming sections 6-1 to 6-4 and the inverse quantizing sections 7-1 to 7-4 are arranged in a number equal to that of the subband-split bands. However, only one quadrature inverse transforming sections and one inverse quantizing section may be provided to achieve a configuration in which input into the inverse quantizing sections and the quadrature inverse transforming sections in the order of the band components. It is also possible to achieve a configuration for high-speed processing by mounting the quadrature inverse transforming sections and the inverse quantizing sections in a member equal to that of the bands and performing parallel processing thereof. Which of these configurations is to be selected may be determined in accordance with the required conditions including the hardware scale and the processing speed.

Figure 5:
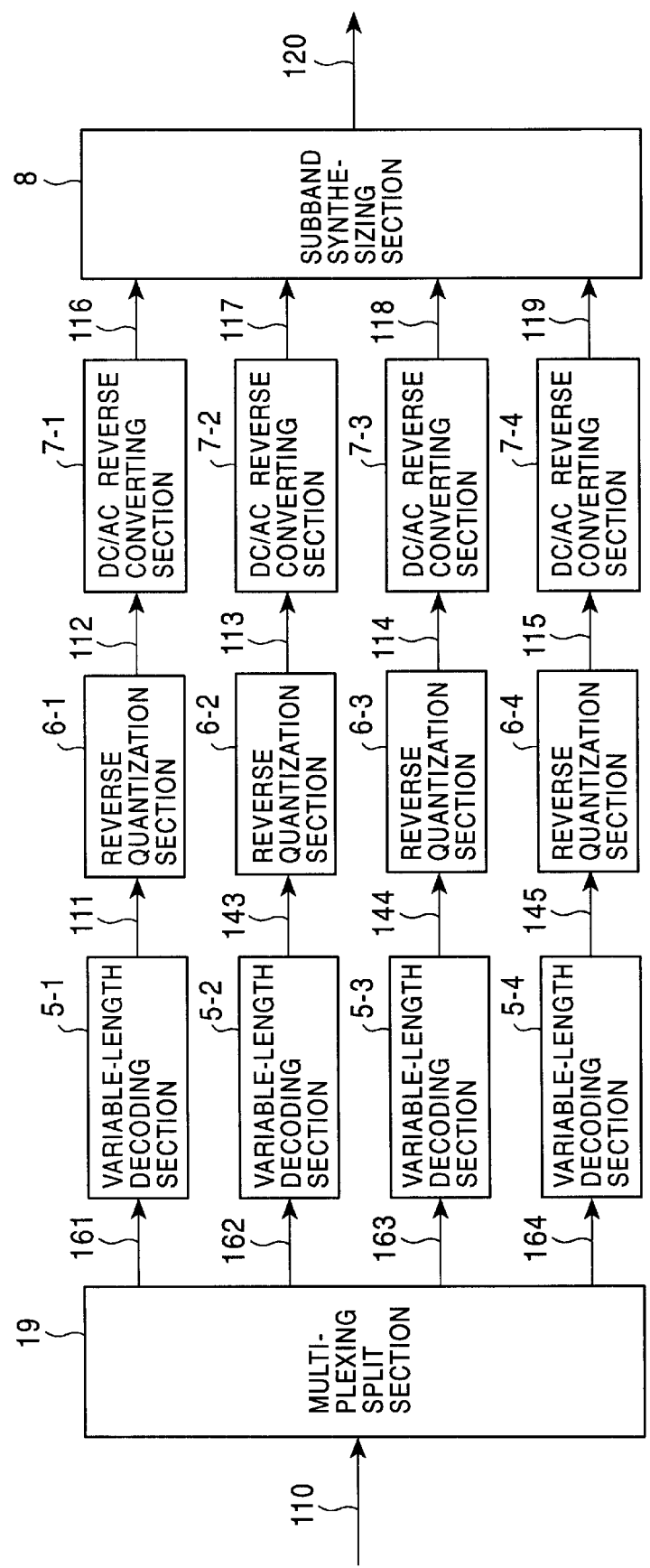
FIG. 5 is a block diagram illustrating a configuration of a second embodiment of the image decoding apparatus of the invention.

In the above-mentioned embodiment, only one variable-length decoding section 5 is provided, and. the coded bit stream 110 are separated for each band component. It is also possible, as shown in FIG. 5, to provide a multiplexing separating section 19 and variable-length decoding sections 5-1 to 5-4 for the individual band components, and to provide the variable-length coding sections 5-1 to 5-4 with variable-length tables incorporating features of the individual band components. With such a configuration, it is possible to further reduce the volume of occurrence of coded bits.

Figure 6:
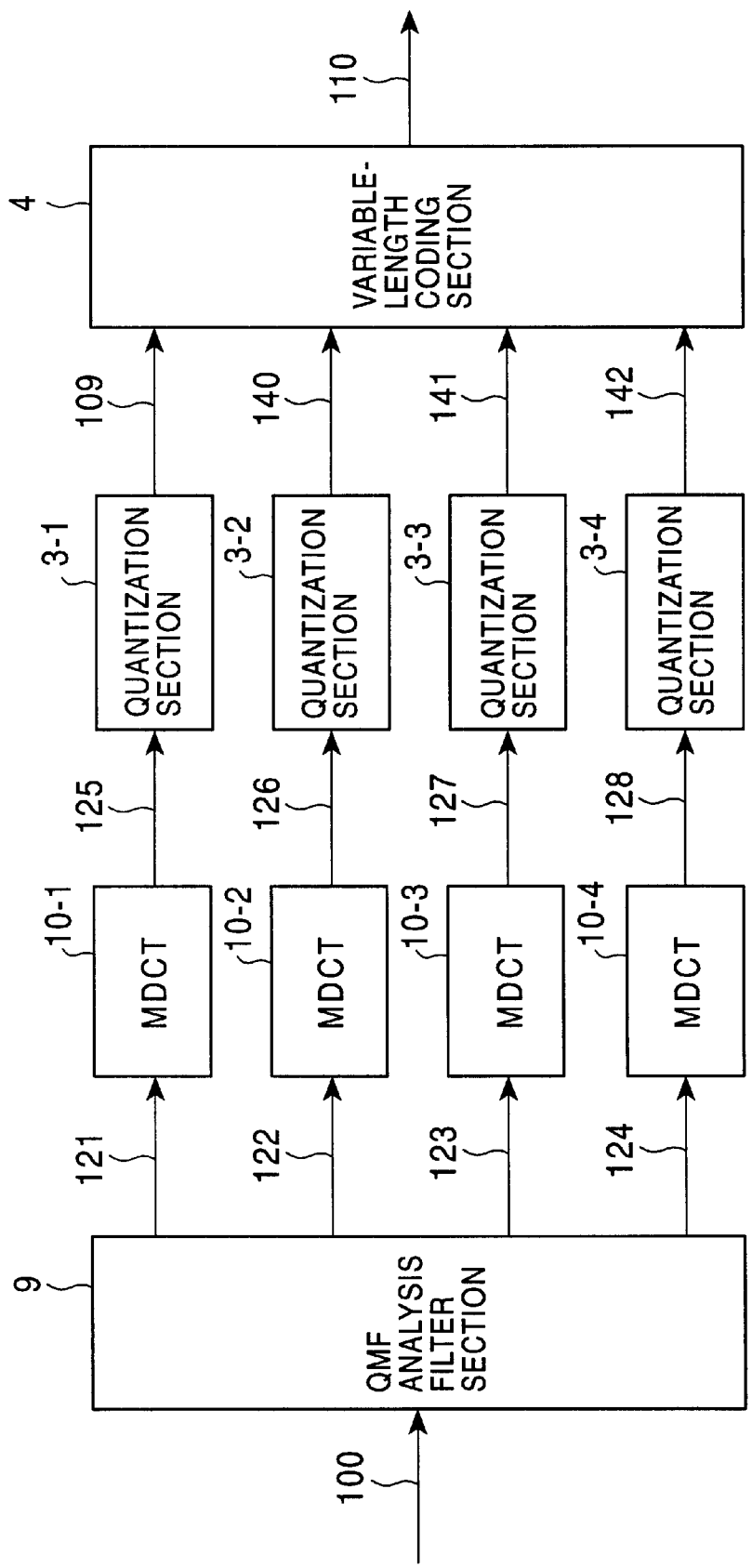
FIG. 6 is a block diagram illustrating a configuration of a third embodiment of the image decoding apparatus of the invention.

A third embodiment of the image coding apparatus of the invention will now be described with reference to FIG. 6. In FIG. 6, portions corresponding to those in FIG. 1 are assigned with the same reference numerals, and description thereof is omitted.

In FIG. 6, the subband splitting section 1 is replaced by a QMF (Quadrative Mirror Filter) analysis filter section 9 (splitting means), and the quadrature transforming sections 2-1 to 2-4 are replaced by MDCTs 10-1 to 10-4 (quadrature transforming sections). For the other aspects, the configuration shown in FIG. 6 is the same as that shown in FIG. 1.

The QMF analysis filter section 9 splits the digitized input image 100, for example, into two in the horizontal and vertical directions, respectively, and generates and outputs four band images (LL, HL, LH and HH).

MDCTs 10-1 to 10-4 apply MDCT to the individual component images split by the QMF analysis filter 9, and output the resultant MDCT coefficients.

Operations of the aforementioned embodiment will now be described.

The QMF analysis filter sections 9 splits the digitized input image 100, for example, into two in the horizontal and vertical directions, respectively, generates four band images (LL, HL, LH and HH), and outputs these images as band images 121 to 124.

When the original signal is split into two bands having a equal band width, ailiasing usually occurs. When using QMF, however, it is possible, when synthesizing the two band components to bring them back to signals of the original bands, to cancel the ailiasing components of the both.

QMF is described in detail by D. Esteban, C. Galand, et al. in "Application of Quadrature Mirror Filters. to Split Band Voice Coding Scheme", IEEE Proc. ICASSP 77, pp. 191–195 (1977).

MCCTs 10-1 to 10-4 apply MDCT processing to the low-level (LL) component image 121, the high-level (HL) component image 122, the high-level (LH) component image 123, and the high-level (HH) component image 124, split by the QMF analysis filter section 9, respectively, and output MDCT coefficients 125 to 128 for the individual band components.

Operations of the MDCTs 10-1 to 10-4 will now be described with reference to FIG. 7. In MDCT, as described as to the conventional case, a transformed block to be processed is generated by causing the block to overlap the neighboring blocks by a half the block size. Therefore, the definition of MDCT of the J-th block having a length of 2M including the overlapping margins is given by the formulae (1) and (2), where w1 (m) is a window function filter. IMDCT is defined, on the other hand, by the formulae (3) and (4), where w2 (n) is a window function filter:

Formula 1

$$X_1(k) = \frac{2}{M} \cdot \sum_{n=0}^{2M-1} wI(n) \cdot a(k, n) \cdot x(n + JM) \quad 0 \leq k < M \quad (1)$$

Formula 2

$$a(k, n) = \cos\left[\pi \cdot (2k + 1) \cdot \frac{2n + M + 1}{(4M)}\right] \quad 0 \leq n < 2M \quad (2)$$

Formula 3

$$y_{1n}(n) = w2(n) \cdot \sum_{k=0}^{M-1} b(k, n) \cdot X_1(k) \quad 0 \leq n < 2M \quad (3)$$

Formula 4

$$b(k, n) = \cos\left[\pi \cdot (2k + 1) \cdot \frac{2n + M + 1}{(4M)}\right] \quad 0 \leq k < M \quad (4)$$

Figure 7:
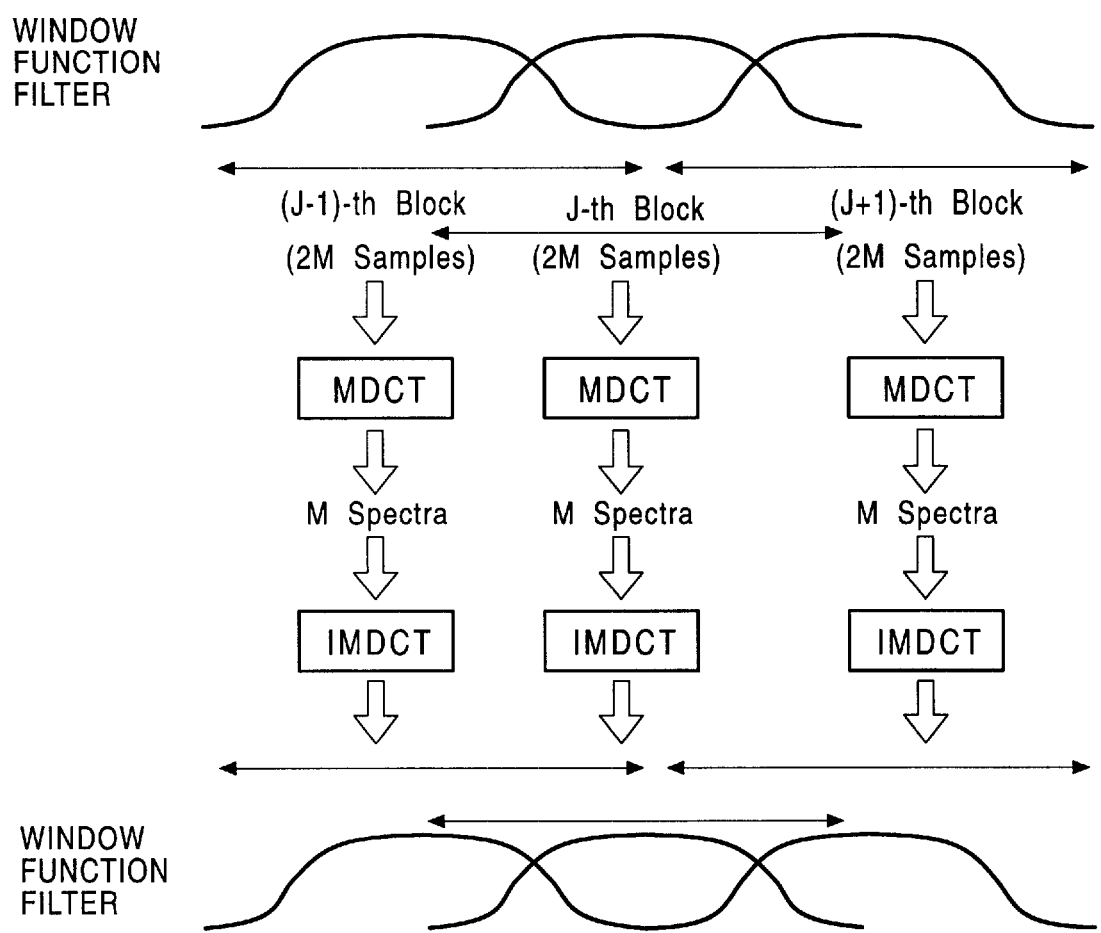
FIG. 7 schematically illustrates of MDCT.

FIG. 7 illustrates determination of amplitude values for M frequency components by convolving a window function filter coefficient and MDCT's frequency components into the (J−1)-the block, the J-th block, and the (J+1)-th block overlapping by half a width (having 2M sample number).

On the other hand, the amplitude values of M frequency components are restored to original signals by convolving IMDCT's frequency component and the window function filter coefficient. In FIG. 7, the window function filter upon carrying out MDCT and the window function filter upon carrying out IMDCT are known to be capable of perfectly regenerate the original signal if certain conditions are satisfied, even if the two filters are not the same.

MDCT coefficients of the individual components are quantized at the quantizing sections 3-1 to 3-4, and scanned as required. The quantization coefficients 109, 140, 141 and 142 for the individual band components are output. The quantization coefficients of the individual band components are variable-length-coded at the variable-length coding section 4, and output as a coded bit stream 110.

In the aforementioned embodiment, a QMF analysis filter section 9 is used as a subband splitting section.

It may however be other band split filter, and for example, it is possible to use the PQF (Polyphase Quadrature filters—A New Subband coding Technique), IEEE Proc. ICASSP 83,27.2, pp.1280–1283, 1983 disclosed by Joseph H. Rothweiler.

A configuration of a third embodiment of the image decoding apparatus of the invention will now be described with reference to FIG. 8.

Figure 8:
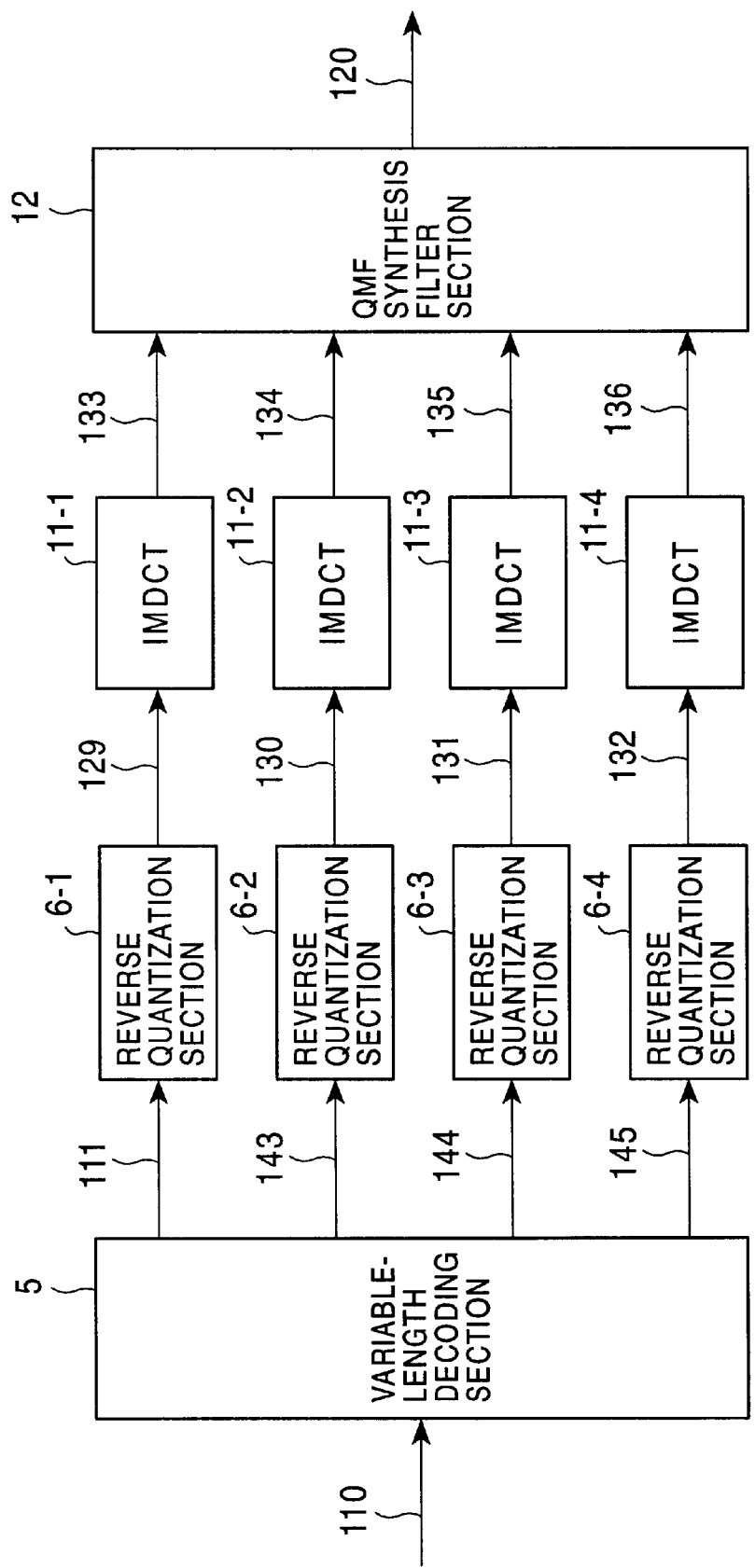
FIG. 8 is a block diagram illustrating a configuration of a third embodiment of the image decoding apparatus of the invention.

FIG. 8 is a block diagram illustrating a configuration of the third embodiment of the image decoding apparatus of the invention. In FIG. 8, portions corresponding to those shown in FIG. 4 are assigned: the same reference numerals, and description thereof is omitted. This embodiment covers an image decoding apparatus corresponding to the image coding apparatus shown in FIG. 6.

In this embodiment, as compared with the case shown in FIG. 4, the quadrature inverse transforming sections 7-1 to 7-4 are replaced by IMDCTs (Inverse MDCTs) 11-1 to 11-4 (quadrature transforming means), and the subband synthesizing section 8 is replaced by a QMF synthesizing filter section 12 (synthesizing means). For the other aspects, the apparatus shown in FIG. 8 has the same configuration as that shown in FIG. 4.

The IMDCTs 11-1 to 11-4 apply IMDCT to quadrature transformation coefficients 129 to 132 for the individual band components output from the inverse quantizing sections 6-1 to 6-4, and output image signals for the individual resultant band components.

A QMF synthesizing filter section 12 synthesizes image signals for the individual band components output from the inverse quantizing sections 6-1 to 6-4, and outputs a final decoded image signal 120.

Operations of the above-mentioned embodiment will now be described.

A variable-length decoding section 5 receives input of a coded bit stream 110, and outputs quantization, coefficients 111, 143, 144 and 145 for the individual band components through decoding.

The quantization coefficients 111, 143, 144 and 145 output from the variable-length coding section 5 are subjected to inverse quantization at the inverse quantizing sections 6-1 to 6-4 and inversely scanned as required, to generate quadrature transformation coefficients 129 to 132 for the individual band components.

The quadrature transformation coefficients 129 to 132 are IMDCT-processed at the IMDCTs 11-1 to 11-4, thus restoring the images 133 to 136 for the individual band components. These restored images for the individual band components are band-synthesized at the QMF synthesizing filter section 12, thereby giving a final decoded image signal 120. The mathematical expression of IMDCT has already been described in Formulae (3) and (4).

Restoration of an image using IMDCT will be described with reference to FIG. 9.

Figure 9:
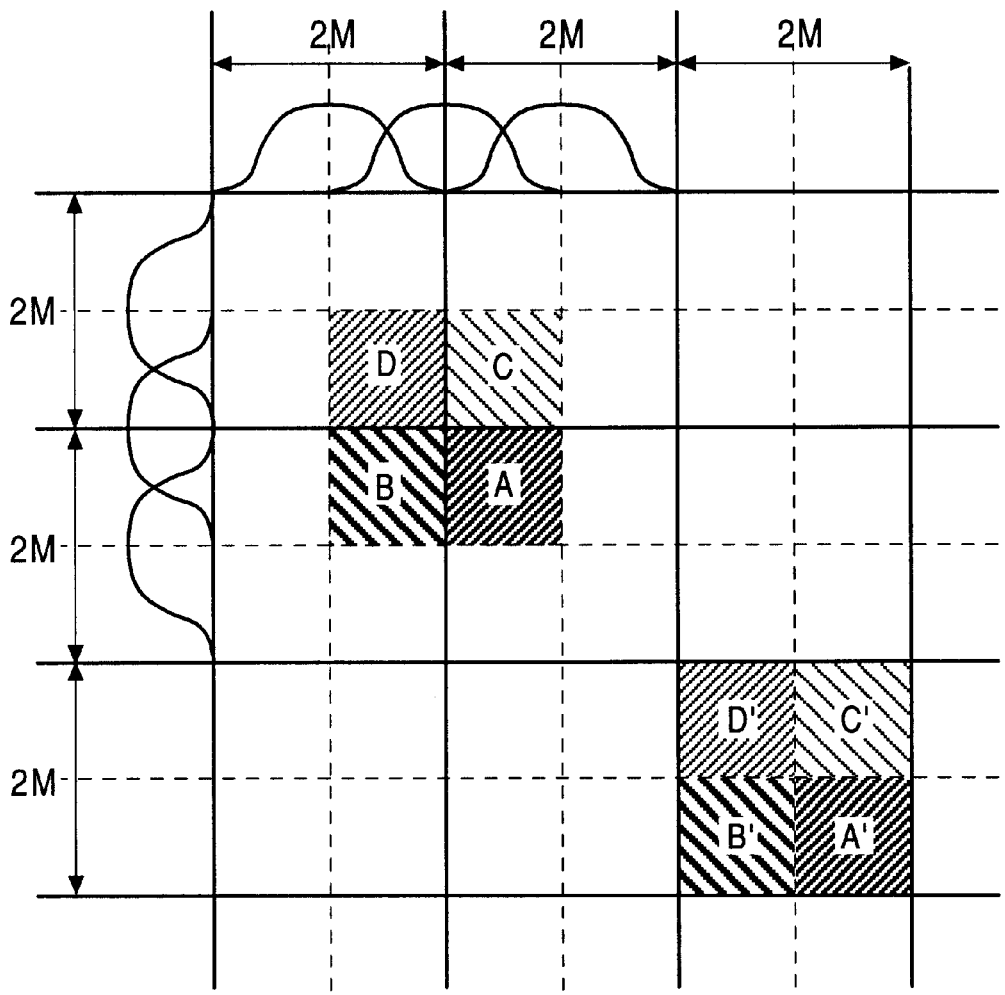
FIG. 9 illustrates a case of restoring image blocks by IMDCT.

FIG. 9 illustrates, in a 2M×2M size block, overlap of M×M portions in the longitudinal and transverse directions overlapping the other blocks. In order to IMDCT-decode an M×M block A located at left top of a 2M×2M block, it is necessary to have IMDCT-processed images from a block B located at to right of the 2M×2M block to the left, a black D located at right bottom of the 2M×2M block at diagonally left top, and a block C located at left bottom of the 2M×2M block directly thereabove. By summing up these four block images, the block A image can be restored. Similarly, in order to restore a block A', it is necessary to restore a block B', a block C' and a block D' located in the same 2M×2M block.

The MDCT block size may be any of various sizes by appropriately selecting a value of M of the aforementioned block.

A configuration of a fourth embodiment of the image coding apparatus of the invention will now be described with reference to FIG. 10.

FIG. 10 is a block diagram illustrating a configuration of a fourth embodiment of the image coding apparatus. In FIG. 10, the portions corresponding to those shown in FIG. 6 are assigned the same reference numerals, and description is omitted.

In the embodiment shown in FIG. 10, as compared with the case shown in FIG. 6, a DC/AC coefficient predicting section 13 (predicting means) is added anew. For the other aspects, the configuration shown in FIG. 10 is the same as that shown in FIG. 6.

The DC/AC coefficient predicting section 13 predicts DC coefficients and AC coefficients for the individual band components of MDCT coefficient from DC/AC components of neighboring blocks, and calculates a difference value between the predicted value and MDCT coefficient.

Operations of the aforementioned embodiment will now be described.

The MDCT coefficient 125 of the low-level (LL) component, the MDCT coefficient 126 of the high-level (HL) component, the MDCT coefficient 127 of the high-level (LH) component, and the MDCT coefficient 128 of the high-level (HH) component, output from the MDCTs 10-1 to 10-4 are entered into the DC/AC coefficient predicting section 13, and DC coefficients and AC coefficients for the individual band components are predicted in this section. That is, the DC/AC coefficient predicting section 13 predicts DC coefficients and AC coefficients for the individual band components of the MDCT coefficient from the DC/AC components of neighboring blocks, and outputs the difference between the predicted value and the MDCT coefficient as a predicted differential coefficient.

The resultant predicted differential coefficients of the individual components are determined on the assumption of a predicted differential coefficient 137 of the MDCT coefficient of the low-level (LL) component, a predicted differential coefficient 146 of the MDCT coefficient of the high-level (HL) component, a predicted differential coefficient 147 of the MDCT coefficient of the high-level (LH)

component, and a predicted differential coefficient 148 of the MDCT coefficient of the high-level (HH) component, and output from the DC/AC coefficient predicting section 13.

The predicted differential coefficients of the MDCT coefficient for the individual band components output from the DC/AC coefficient predicting section 13 are quantized at the quantizing sections 3-1 to 3-4, respectively, and scanned as required. The quantization coefficients 149 to 152 for the individual band components are output to the variable-length coding section 4. Prediction of DC and AC coefficients can be simply accomplished by taking a difference of the neighboring blocks from the block to be coded. As a result, the volume of information can be reduced through a simple processing by utilizing spatial redundancy of an image (presence of a close correlation between pixel values located spatially close to each other).

A fifth embodiment of the image coding apparatus of the invention will now be described, with reference to FIGS. 11A and 11B.

The configuration shown of the fifth embodiment of the image coding apparatus of the invention is the same as that shown in FIG. 1 or 6 except for operations of the quantizing sections 3-1 to 3-4. For the other aspects, the configuration is the same as that shown in FIG.,1 or 6.

In the fifth embodiment of the image coding apparatus of the invention, the quantizing sections 3-1 to 3-4 adaptively scans quantization coefficient for the individual band components and rearranges the quantization coefficients so as to reduce the volume of information.

Figure 11A:
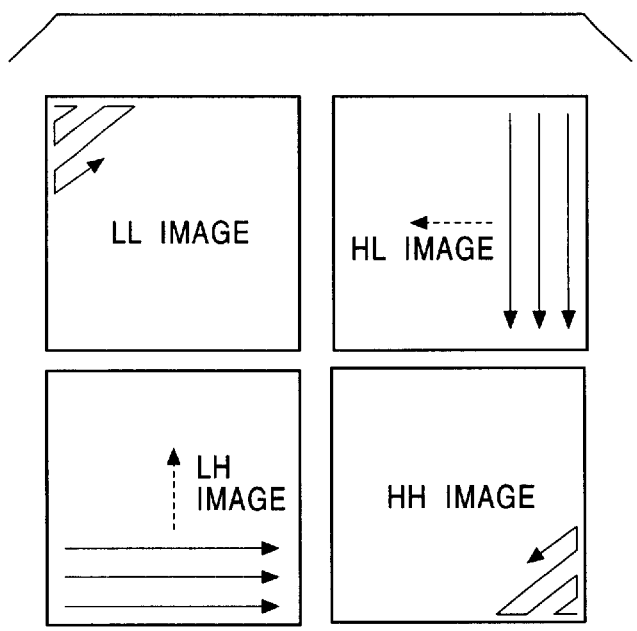
FIGS. 11A and 11B illustrate a fifth embodiment of the image coding apparatus of the invention and operations of the fourth embodiment of the invention.
Figure 11B:
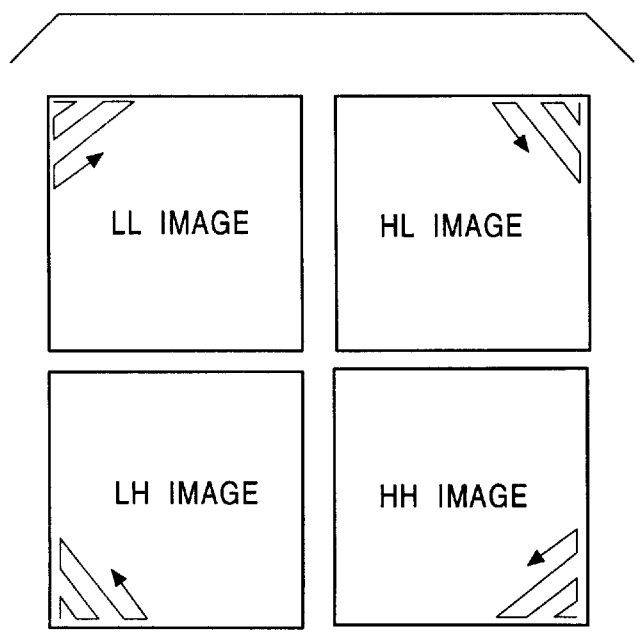

FIGS. 11A and 11B illustrate this adaptive scanning by means of two adaptive scanning methods (A) and (B). The method (A) comprises conducting zigzag scanning from top left to right bottom of an LL image. For an HL image, scanning is carried out vertically from top right, and after completion of a line, the line adjacent to the left is scanned. Scanning is continued until the left bottom is reached. For an LH image, scanning is performed from left bottom in the horizontal direction. Upon completion of a line, scanning is shifted to the line directly above, and scanning is thus continued until right top is reached. Finally, for an HH image, zigzag scanning is conducted from right bottom to left top.

On the other hand, (B) represents an example in which zigzag scanning is carried out adaptively in all cases. Such adaptive scanning by band components improves the possibility of scanning from a larger coefficient toward a smaller one, thus permitting expectation of an advantage to reduce the number of coded bits.

A fourth embodiment of the image decoding apparatus of the invention will now be described with reference also to FIGS. 11A and 11B.

The third embodiment of the image decoding apparatus of the invention corresponds to the aforementioned fifth embodiment of the image coding apparatus, and has the same configuration as that shown in FIG. 3 or 8 except for different operations of the inverse quantizing sections 6-1 to 6-4. For the other aspects, the configuration is the same as that shown in FIG. 2 or 8.

In the third embodiment of the image decoding apparatus of the invention, the quantizing sections 6-1 to 6-4 perform adaptive inverse scanning for the individual band components, and quantization coefficients are rearranged to return to the original sequence. The other operations are the same as those presented above. This inverse scanning is carried out in a sequence corresponding to the aforementioned image coding apparatus.

According to the above-mentioned embodiment, an adaptive scanning is performed by reflecting features of the individual band components, thus permitting reduction of the volume of coded bits.

A sixth embodiment of the image coding apparatus of the invention will now be described with reference to FIG. 12.

Figure 12:
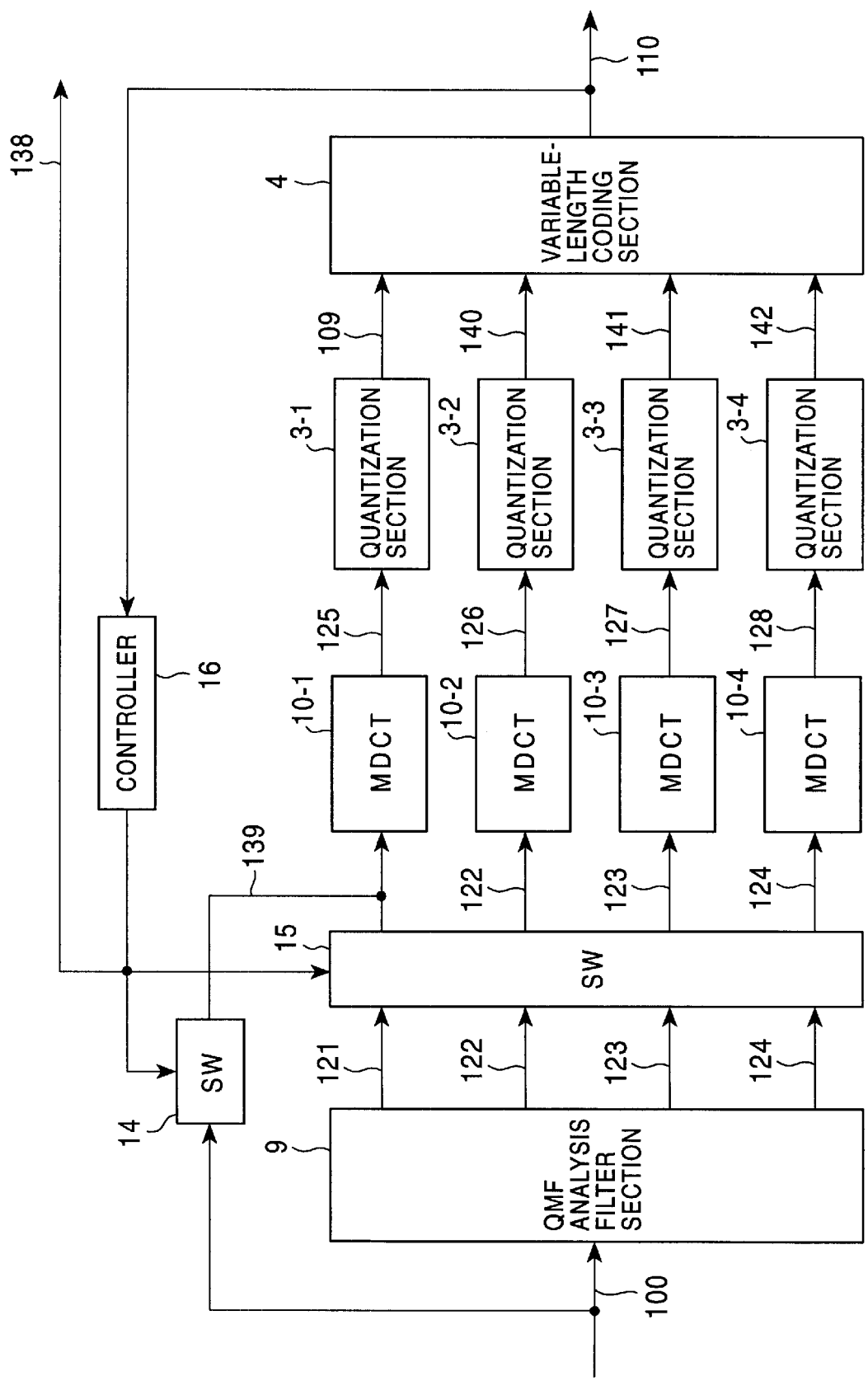
FIG. 12 is block diagram illustrating a configuration of a sixth embodiment of the image coding apparatus of the invention.

FIG. 12 is a block diagram illustrating a configuration of the sixth embodiment of the image coding apparatus of the invention. In FIG. 12, portions corresponding to those shown in FIG. 6 are assigned the same reference numerals, and description thereof is omitted. As compared with the embodiment shown in FIG. 6, SWs (switches) 14 and 15 and a controller 16 (control means) are added anew in the embodiment shown in FIG. 12. For the other aspects, the configuration is the same as in FIG. 6.

The SW 14 (second selecting means) is controlled by the controller 16: when its status is ON, an original image 100 is supplied to an MDCT 10-1, and when it is OFF, an output from the SW 15 (first selecting means) is supplied to the MDCT 10-1.

The SW 15 is also controlled by the controller 16. It selects prescribed signals from outputs 121 to 124 of the QMF analysis filter 9 and supplies the same to the MDCTs 10-1 to 10-4, respectively.

The controller 16 controls the SWs 14 and 15 in accordance with the kind of an entered image and initialization.

Operations of the aforementioned embodiment will now be described with reference to FIG. 13.

Figure 13:
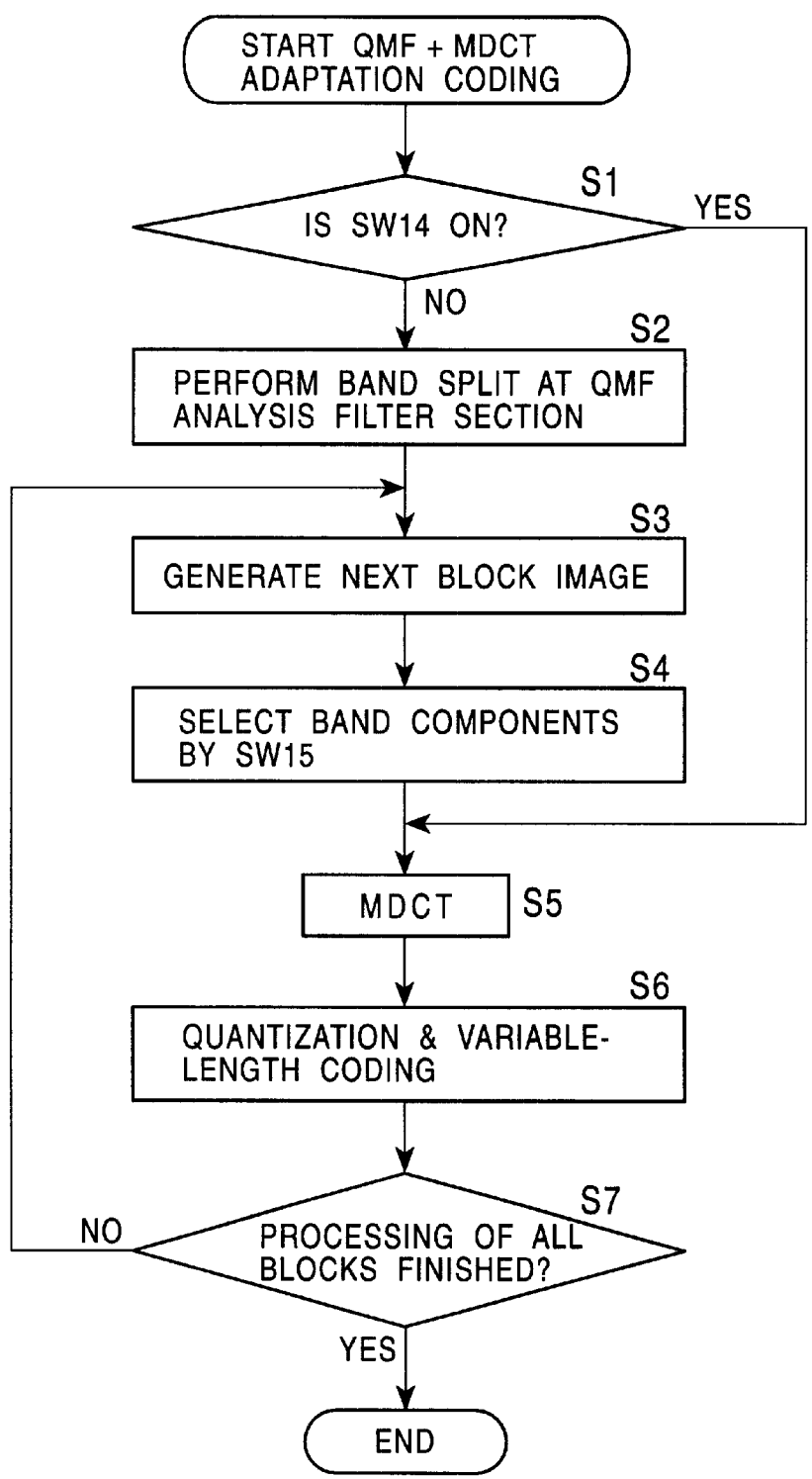
FIG. 13 is a flowchart illustrating an example of processing carried out in the embodiment shown in FIG. 12.

FIG. 13 is a flowchart illustrating operations of the embodiment shown in FIG. 12. When the original image 100 is entered into the embodiment shown in FIG. 12 and processing is started, if the SW 14 is in ON state in step S1 (YES), the process proceeds to step S5, and if the SW 14 is OFF (NO), the process goes to step S2.

When the SW 14 is OFF, the process proceeds to step S2: the QMF analysis filter band-splits the entered original image 100, and outputs individual component image signals 121 to 124.

In step S3, the QMF analysis filter 9 conducts processing for generating an image for the next block, and the process goes to step S4.

In step S4, the controller 16 controls the SW 15, selects prescribed band components, and provides an output to the MDCTs 10-1 to 10-4. More specifically, the. controller 16 calculates the volume of coded bits from a coded bit stream output from the variable-length coding section 4. When it determines that the resultant value is larger than a target volume of bits, the controller: 16 sends, for example, a control signal 138 to the SW 15 to reduce the volume of occurrence of bits, and outputs only the low-level (LL) image from the SW 15 for input into the MDCT 10-1. When it determines that the resultant value is smaller than the target volume of bits, the controller 16 causes the SW 15 to select a plurality of band images including the high-level images so as to increase the volume of bits.

In step S5, the MDCTs 10-1 to 10-4 apply MDCT to the individual band components output from the SW 15, and outputs the same. For the MDCTS 10-1 to 10-4 for which the individual band components are not output from the SW 15, MDCT process is not carried out.

In the following step S6, quantization and variable-length coding are carried out at the quantizing sections 3-1 to 3-4 and the variable-length coding section 4, and as a result, a coded bit stream 110 is output.

In step S7, it is determined whether or not processing has been completed for all the blocks. As a result, when it is determined that processing has been completed (YES) for all the blocks, processing comes to an end (END). When it is determined that processing has not as yet been completed (NO) for all the blocks, the process returns to step S3, to repeat the same processing as above.

When the SW 14 is ON state (YES) in step S1, the process goes to step S5. In step S5, the original image 100 supplied via the SW 15 is MDCT-processed at the MDCT 10-1. The subsequent steps are the same as above.

According to the aforementioned embodiment, the quadrature transformation for each of the band-split components and the quadrature transformation of the original image before splitting are adaptively switched over in response to the coded bit rate to accomplish coding. It is therefore possible to improve efficiency of coding as a whole.

In the aforementioned embodiment, selection of a band-split image is controlled by the controller 16 via opening/closing of the SW 15. When the screen is not band-split, however, it suffices to being the SW 14 to ON state in accordance with the control signal from the controller 16 so that the original 100 is MDCT-processed as it is as an output signal 139 of the SW 14 at the MDCT 10-1. For example, when the input image is an image for which band splitting does not exert a remarkable effect, when it is not necessary to reduce the amount of calculation, or when a relatively high volume of coded bits is allowed, MDCT processing of the original image as it is more favorable.

A fifth embodiment of the image decoding apparatus of the invention will now described with reference to FIG. 14.

Figure 14:
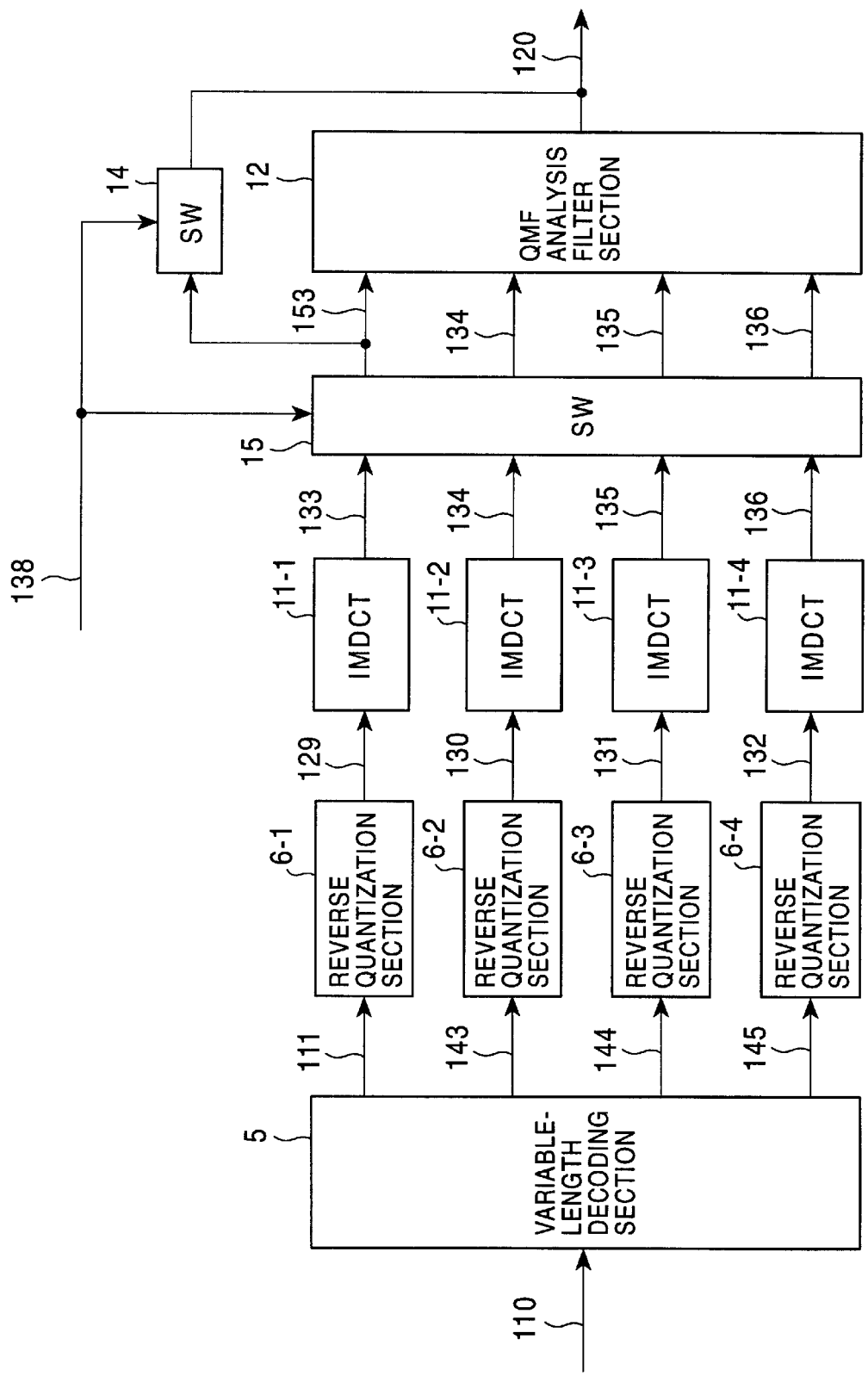
FIG. 14 is a block diagram illustrating a configuration of a fifth embodiment of the image decoding apparatus of the invention.

FIG. 14 is a block diagram illustrating a configuration of a fourth embodiment of the image decoding apparatus of the invention. This image decoding apparatus has a configuration corresponding to that of the image coding apparatus shown in FIG. 12.

In FIG. 14, portions corresponding to those of the embodiment shown in FIG. 8 are assigned the same reference numerals, and description thereof is therefore omitted. As compared with FIG. 8, in the embodiment shown in FIG. 14, an SW 14 (second selecting means) and an SW 15 (first selecting means) are added anew. For the other aspects, the configuration is the same as in FIG. 8.

The SW 15 detects which of the band components is being coded by means of a control signal 138 from the controller not shown, and selects and outputs an image of the selected band component (the restored image generated after IMDCT processing).

The SW 14 is controlled by the control signal 138. When it is in ON state, it selects an image signal 153 of the SW 15, and outputs a decoded image output 120. When it is in OFF state, an output of the SW 15 is fed to the QMF synthesis filter section 12.

Operations of the aforementioned embodiment will now be described.

When a restored image is band-split in the image coding apparatus, the SW 15 selects the image of the band component coded in the image coding apparatus (the restored image generated after IMDCT) in response to the control signal 138, and supplies the same to the QMF synthesis filter 12. At this point, the SW 14 is in OFF state.

The QMF synthesis filter 12 synthesizes the band image supplied by the SW 15, and outputs the resultant image as a restored image 120.

When the restored image is not band-split in the image coding apparatus, the SW 14 is brought into ON state by the control signal 138, and an image signal 153 through IMDCT processing is output via the SW 14 as a decoded image 120 in the form as it is.

According to the aforementioned embodiment, it is possible to efficiently decode a coded image.

Figure 15:
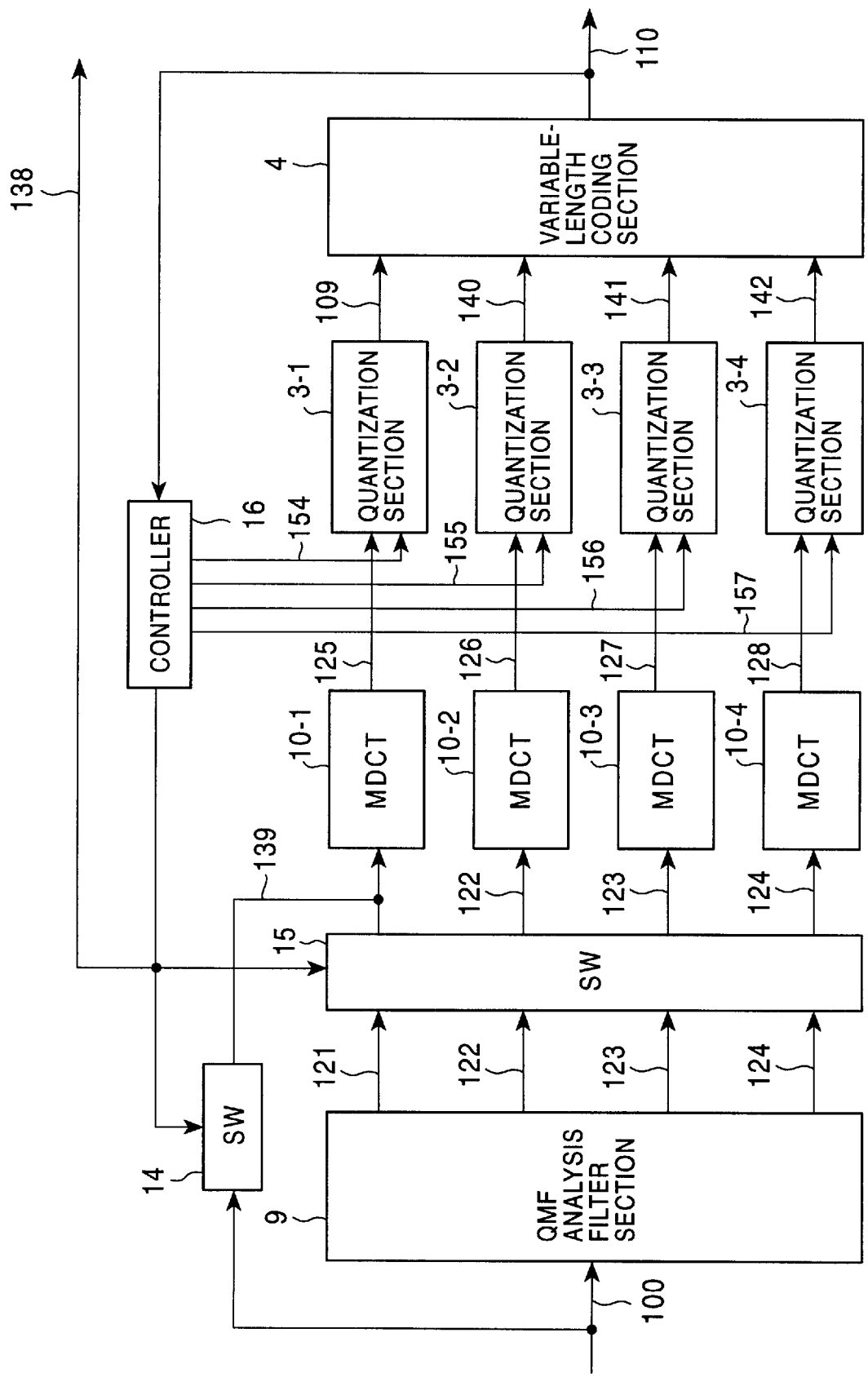
FIG. 15 is a block diagram illustrating a configuration of a seventh embodiment of the image decoding apparatus of the invention.

A seventh embodiment of the image coding apparatus of the invention will now be described with reference to FIG. 15. In FIG. 15, portions corresponding to those shown in FIG. 12 are assigned the same reference numerals, and description thereof is therefore omitted. As compared with the embodiment shown in FIG. 12, in the embodiment shown in FIG. 15, quantizing sections 3-1 to 3-4 are controlled by a controller 16. For the other aspects, the configuration is the same as in FIG. 12.

The quantizing sections 3-1 to 3-4 adjusts quantizing step size upon quantization of MDCT coefficient resulting from MDCT processing of a band image selected by an SW 15 in accordance with control signals 154 to 157 from the controller 16.

Operations of the aforementioned embodiment will now be described.

The controller 16 compares a coded bit stream,110 output from the variable-length coding section 4 with a target volume of coded bits, and controls the quantizing sections 3-1 to 3-4 in response to the result of this comparison.

The quantizing sections 3-1 to 3-4 quantize, through a prescribed quantizing step, MDCT coefficients 125 to 128 output from the MDCTs 10-1 to 10-4 in accordance with control signals 154 to 157 output from the controller 16, and output the result to the variable-length coding section 4.

Therefore, the controller 16 outputs a quantizing step size 154 of the low-level (LL) component, a quantizing step size 155 of the high-level (HL) component, a quantizing step size 156 of the high-level (LH) component, and a quantizing step size 157 of the high-level (HH) component.

According to the aforementioned embodiment, for example, a code volume control based on the quantization step size is possible, in addition to the control through selection of a band component image at the SW 15 in the sixth embodiment as shown in FIG. 12, thereby permitting achievement of a more scrupulous control.

An eighth embodiment of the image coding apparatus of the invention will now be described with reference to FIG. 16.

Figure 16:
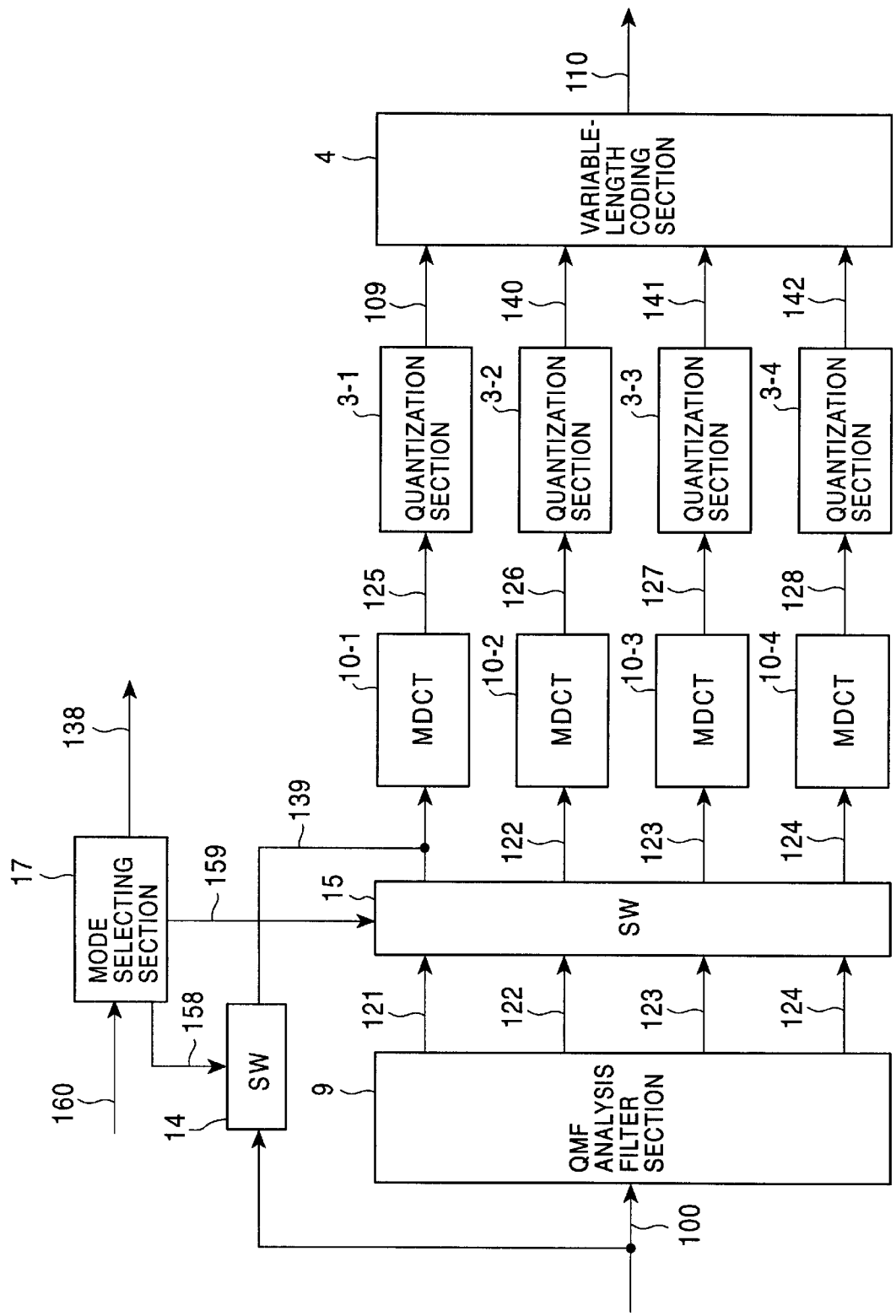
FIG. 16 is a block diagram illustrating a configuration of a eighth embodiment of the image decoding apparatus of the invention.

FIG. 16 is a block diagram illustrating a configuration of the eighth embodiment of the image coding apparatus of the invention. In FIG. 16, portions corresponding to those shown in FIG. 12 are assigned the same reference numerals, and description thereof is therefore omitted.

As compared with the embodiment shown in FIG. 12, in the embodiment shown in FIG. 16, the controller 16 is replaced by a mode selecting section (mode selecting means, second control means). For the other aspects, the configuration is the same as in FIG. 12.

The mode selecting section 17 inputs a target volume of coded bits 160, determines a particular coding mode from a coding bit rate calculated on the basis of a prescribed calculation formula (described later), and controls the SWs 14 and 15 in accordance with the determined coding mode.

Operations of the aforementioned embodiment will now be described.

The mode selecting section 17 inputs a target volume of bits 160, and applies the following formula to the entered target bit volume 160 to calculated a coding bit rate.

Coding bit rate (Bitrate)=target bit volume/total pixels of image (5)

where a general-purpose BPP (Bit Per Pel: meaning a coding bit volume required per pixel) is used as the coding bit rate (Bitrate).

Upon calculating a coding bitrate, the mode selecting section 17 controls the SWs 14 and 15 in accordance with the following conditional formulae:

if(Bitrate>1.0bpp){SW14=ON;SW15=OFF;}else if(Bitrate<=1.0bpp&&Bitrate>=0.125)}SW14=OFF;SW15=ON;

All_band(LL,HL,LH,HH) are selected.}else {SW14=OFF;SW15=ON;

LL_band selected.}     (6)

More specifically, when the bitrate (coding bit rate) is larger than 1.0 bpp, the SW 14 is turned ON, and the SW 15 is turned OFF. When the bitrate is larger than 0.125 bpp, and (&&) is smaller than 1.0 bpp, the SW 14 is turned OFF, and the SW 14 is turned ON. Thus, MDCT coefficients corresponding to all the bands (LL, HL, LH and HH) would be selected. In the other cases, the SW 14 is turned OFF and the SW 15 is turned ON, selecting and outputting only the MDCT coefficient corresponding to the low-level image LL.

According to the aforementioned embodiment, in which a coding mode is selectible in response to the target bit volume of coding, a high coding efficiency is always available, irrespective of the nature of the input image or the difference in coding rate.

A sixth embodiment of the image decoding apparatus of the invention will now be described with reference to FIG. 17.

Figure 17:
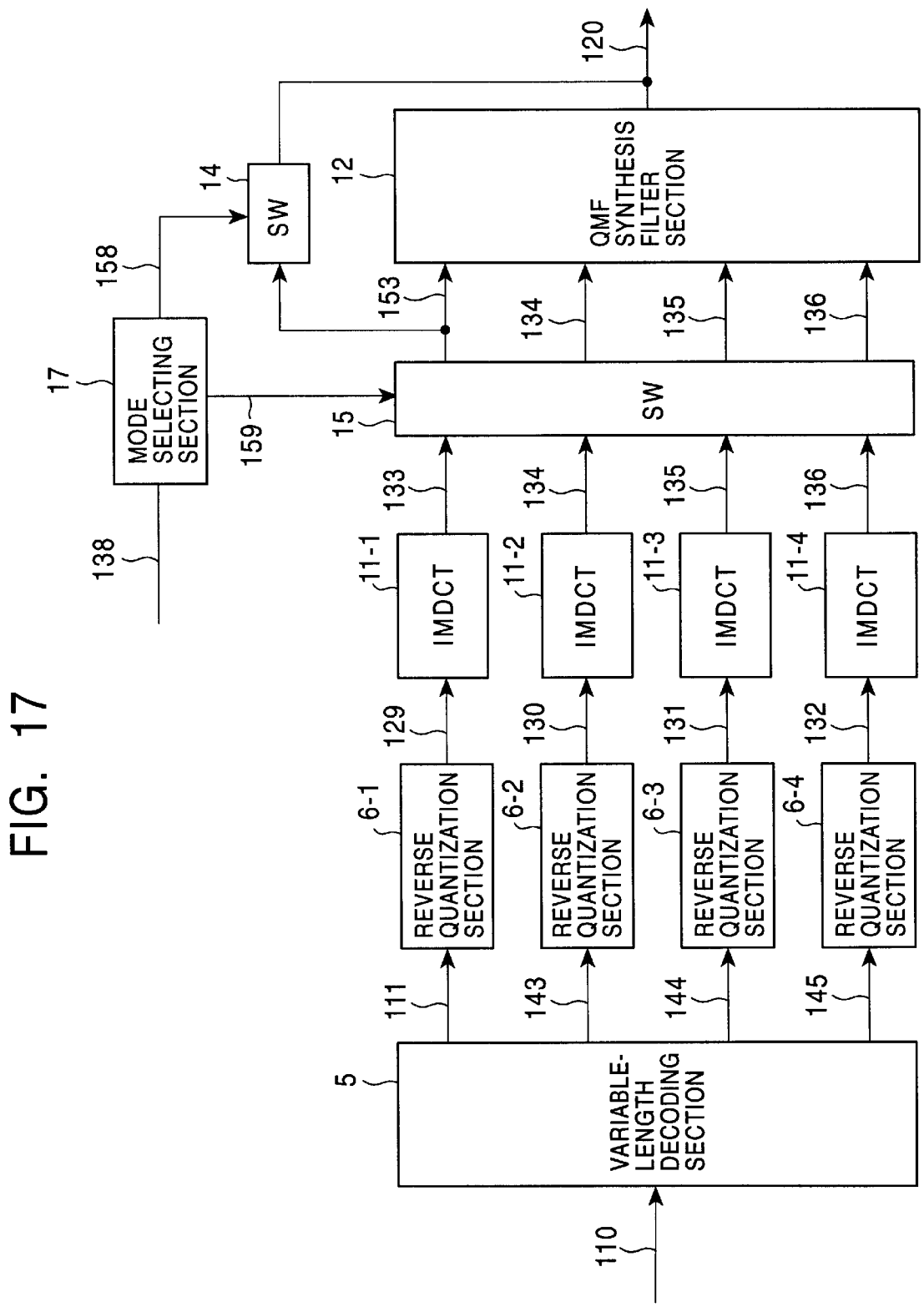
FIG. 17 is a block diagram illustrating a configuration of a sixth embodiment of the image decoding apparatus of the invention.

FIG. 17 is a block diagram illustrating a configuration of the sixth embodiment of the image decoding apparatus of the invention. This embodiment has a configuration corresponding to the image coding apparatus shown in FIG. 16. In FIG. 17, portions corresponding to those shown in FIG. 14 are assigned the same reference numerals as in FIG. 14, and description thereof is therefore omitted As compared with the embodiment shown in FIG. 14, in this embodiment, a mode selecting section 17 (control means) is added anew. For the other aspects, the configuration is the same as in FIG. 14.

the mode selecting section 17 controls the SWs 14 and 15 on the basis of the conditional formula in the above-mentioned formula (6).

Operations of the aforementioned embodiment will now be described.

The mode selecting section 17 receives an input of a coding mode control signal 138 transmitted from the image coding apparatus, and controls the SWs 14 and 15 in accordance with the entered control signal 138.

More specifically, in the image coding apparatus, when the Bitrate (coding bit rate) is larger than 1.0 bpp, the SW 14 is turned ON, and the SW 15 is turned OFF. When the Bitrate is larger than 0.125 bpp, and (&&) is smaller than 1.0 bpp, the SW 14 is turned OFF, and the SW 15 is turned ON. Thus all the component images (LL, HL, LH and HH) would be selected. Further, in the other cases, the SW 14 is turned OFF, and the SW 15 is turned ON. Only the low-level image LL would be selected and output. As a result, it is possible to selected a particular coding mode, and obtain a decoded image.

In the above-mentioned embodiments, description has been mainly based on a still image. It is needless to mention, however, that the present invention is applicable, not only to a still image, but also to a dynamic image.

Finally, in the present specification, the term transmission media include, in addition to information recording media such as FD and CD-ROM, network transmission media used in such applications as internet and digital satellite.

In accordance with the first aspect of the invention, the image coding apparatus, the image coding method and the transmission medium rely on a series of steps including splitting an image into a plurality of bands, applying quadrature transformation to the resultant band component images, quantizing the resultant quadrature transformation coefficients, and variable-length-coding the resultant quantized coefficients of the individual band components to generate a coded bit stream. It is therefore possible to conduct coding less susceptible to block strain at a high compression ratio even for an image having many high-level components in vertical or horizontal components.

In accordance with another aspect of the invention, the image decoding apparatus, the image decoding method, and the transmission medium rely on a series of steps including variable-length-decoding a coding bit stream of an image, inversely quantizing the resultant plurality of band component quantization coefficients, inversely quadrature-transforming the resultant quadrature transformation coefficients of the individual band components, and synthesizing the resultant images of the individual band components. It is therefore possible to accomplish decoding less susceptible to block strain at a high compression ratio even for an image having many high-level components in vertical or horizontal components.

In accordance with still another aspect of the invention, the image coding apparatus, the image coding method, and the transmission medium rely on a series of steps including splitting an image into a plurality of bands, selecting an image of a prescribed band component from the images of the resultant plurality of band. components, selecting the image of a selected prescribed band component, or an original image not split, applying quadrature transformation to the selected image of the prescribed band component or the original image, quantizing the resultant quadrature transformation coefficient, variable-length-coding the resultant quantized coefficients to general a coded bit stream, calculating a bit volume of the generated coded bit stream, and conducting control so as to select the image of the prescribed band component in response to the calculated volume of bits. It is therefore possible to select coding of the band-split images or coding of the original image as it is. In this configuration, only the selected band component is coded from among the images of the individual band-split components. It is therefore possible to achieve a highly accurate rate control, and also to cope with coding of bit rates within a wide range from low to high rates.

In accordance with a further aspect of the invention, the image decoding apparatus, the image decoding method, and the transmission medium rely on a series of steps including variable-length-decoding a coded bit stream of an image, inversely quantizing the resultant quantization coefficients, inversely quadrature-transforming the resultant quadrature transformation coefficients for each band component, selecting images of prescribed band components from the resultant images of band components, synthesizing the images of the selected band components, and selecting a synthesized restored image when the coded image is band-split in the image coding apparatus, or selecting a restored image obtained through inverse quadrature transformation when the image is not band-split. It is therefore possible to decode the original image band-split or as it is in response to the extent of the volume of coding bits or the nature of the input image. From among the images of the individual band-split components, only the image having only the coded band component selected by bitrate control. It is therefore possible to achieve a very highly accurate rate control, and to decode an image coded at a rate within a very wide range from low to high rates.

What is claimed is:

1. An image coding apparatus of a coding an image, comprising:

splitting means which splits an image into a plurality of bands;

first selecting means which selects an image of a prescribed band component from images of the plurality of band components obtained by said splitting means;

second selecting means which selects any one of the image of the prescribed band component selected by said first selecting means and the original image not split;

quadrature transforming means which applies quadrature transformation to the image of the band component or the original image, as selected by said second selecting means;

quantizing means which quantizes a quadrature transformation coefficient obtained by said quadrature transforming means;

generating means which generates a coded bit stream through variable-length coding of the quantization coefficient obtained by said quadrature transforming means; and control means which calculates the volume of codes of said coded bit stream generated by said generating means, and controls said second selecting means in response to the thus calculated volume of codes.

2. An image coding apparatus according to claim 1, wherein said apparatus is further provided with:

mode selecting means of selecting a coding mode by entering a target volume of bits to be coded; and second control means of controlling said first and second selecting means in accordance with an instruction signal from said mode selecting means.

3. An image coding method of coding an image, comprising:

a splitting step of splitting an image into a plurality of bands;

a first selecting step of selecting an image of a prescribed band component from the images of the plurality of band components obtained in said splitting step;

a second selecting step of selecting any one of the image of the prescribed band component selected in said first selecting step and the original image not split;

a quadrature transforming step of applying quadrature transformation to the image of the prescribed band component or the original image selected in said second selecting step;

a quantizing step of quantizing the quadrature transformation coefficient obtained in said quadrature transforming step;

a generating step of generating a coded bit stream by variable-length-coding the quantization coefficient obtained in said quadrature transforming step; and a control step of calculating a volume of codes of the coded bit stream generated in said generating step and controlling said second selecting step in response to the thus calculated volume of codes.

4. A transmission medium for transmitting a computer program used in an image coding apparatus coding an image, wherein said computer program comprises:

a splitting step of splitting an image into a plurality of bands;

a first selecting step of selecting an image of a prescribed band component from the images of the plurality of band components obtained in said splitting step;

a second selecting step of selecting any one of the image of the prescribed band component selected in said first selecting step and the original image not split;

a quadrature transforming step of applying quadrature transformation to the image of the prescribed band component or the original image selected in said second selecting step;

a quantizing step of quantizing the quadrature transformation coefficient obtained in said quadrature transforming step;

a generating step of generating a coded bit stream by variable-length-coding the quantization coefficient obtained in said quadrature transforming step; and a control step of calculating a volume of codes of the coded bit stream generated in said generating step and controlling said second selecting step in response to the thus calculated volume of codes.

5. An image coding method comprising the steps of storing a computer program transmitted by a transmission medium according to claim 4 and coding an image in compliance with the thus stored program.

6. An image coding method comprising the steps of storing a computer program transmitted by a transmission medium according to claim 4 and prescribed information for controlling said first and second selecting steps, and coding an image in compliance with the thus stored program and prescribed information.

7. An image decoding apparatus decoding a coded image, comprising:

variable-length decoding means which variable-length-decodes a coded bit stream of an image;

inverse quantizing means which inverse-quantizes a quantization coefficient obtained by said variable-length decoding means;

quadrature inverse transforming means which quadrature-inverse-transforms, for each band component, a quadrature transformation coefficient obtained by said inverse quantizing means;

first selecting means which selects an image of a prescribed band component from the images of the band components obtained by said quadrature inverse transforming means;

synthesizing means which synthesizes the image of the band component selected by said first selecting means; and second selecting means which selects a restored image obtained by said synthesizing means when said coded image is split into bands in the image coding apparatus, or select a restored image obtained by said quadrature transforming means when the image is not split into bands.

8. An image decoding apparatus according to claim 7, wherein said apparatus is further provided with control means which control said first and second selecting means in accordance with the mode selecting information transmitted from the image coding apparatus.

9. An image decoding method of decoding a coded image, comprising:

a variable-length decoding step of variable-length-decoding a coded bit stream of an image;

a inverse quantizing step of inverse-quantizing a quantization coefficient obtained in said variable-length decoding step;

a quadrature transforming step of quadrature-transforming, for each band component, a quadrature transformation coefficient obtained in said inverse quantizing step;

a first selecting step of selecting an image of a prescribed band component from images of band components obtained in said quadrature inverse transforming step;

a synthesizing step of synthesizing an image of the band component selected in said first selecting step; and a second selecting step of selecting a restored image obtained in said synthesizing step when the coded image is split into bands in the image coding apparatus, or selecting a restored image obtained in said quadrature inverse transforming step.

10. A transmission medium for transmitting a computer program used in an image decoding apparatus of decoding a coded image, wherein said computer program comprises:

a variable-length decoding step of variable-length-decoding a coded bit stream of an image;

a inverse quantizing step of inverse-quantizing a quantization coefficient obtained in said variable-length decoding step;

a quadrature transforming step of quadrature-transforming, for each band component, a quadrature transformation coefficient obtained in said reverse quantizing step;

a first selecting step of selecting an image of a prescribed band component from images of band components obtained in said quadrature transforming step;

a synthesizing step of synthesizing an image of the band component selected in said first selecting step; and a second selecting step of selecting a restored image obtained in said synthesizing step when the coded image is split into bands in the image coding apparatus, and selecting a restored image obtained in said quadrature inverse transforming step.

11. An image decoding method comprising the step of storing a computer program transmitted by the transmission medium according to claim 10, and decoding an image in compliance with the thus stored program.

12. An image decoding method comprising the steps of storing a computer program transmitted by the transmission medium according to claim 10 and prescribed information for controlling said first and second selecting steps, and decoding an image in compliance with the thus stored program and prescribed information.

* * * * *